(12) United States Patent
Laroia et al.

(10) Patent No.: US 8,902,800 B2
(45) Date of Patent: Dec. 2, 2014

(54) METHODS AND APPARATUS FOR COMMUNICATING INFORMATION

(75) Inventors: Rajiv Laroia, Far Hills, NJ (US); Junyi Li, Chester, NJ (US); Vincent D. Park, Budd Lake, NJ (US); Ying Wang, Easton, PA (US); Aleksandar Jovicic, Piscataway, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 860 days.

(21) Appl. No.: 12/427,883

(22) Filed: Apr. 22, 2009

(65) Prior Publication Data

US 2010/0272029 A1    Oct. 28, 2010

(51) Int. Cl.
 G08C 17/00    (2006.01)
 H04B 7/212    (2006.01)
 H04W 4/00    (2009.01)
 H04W 72/04    (2009.01)

(52) U.S. Cl.
 CPC ............................. *H04W 72/0413* (2013.01)
 USPC ........................... 370/311; 370/322; 370/329

(58) Field of Classification Search
 USPC .................... 370/311, 322, 329; 455/574
 See application file for complete search history.

(56) References Cited

U.S. PATENT DOCUMENTS

| 5,983,099 | A | 11/1999 | Yao et al. |
| 6,961,595 | B2 * | 11/2005 | Laroia et al. ................... 455/574 |
| 7,136,655 | B2 | 11/2006 | Skafidas et al. |
| 2003/0142642 | A1 * | 7/2003 | Agrawal et al. ............... 370/328 |
| 2005/0054389 | A1 * | 3/2005 | Lee et al. ....................... 455/574 |
| 2005/0059437 | A1 * | 3/2005 | Son et al. ....................... 455/574 |
| 2005/0118981 | A1 | 6/2005 | Laroia et al. |
| 2005/0197171 | A1 * | 9/2005 | Son et al. ....................... 455/574 |
| 2006/0040642 | A1 * | 2/2006 | Boris et al. .................... 455/407 |
| 2006/0205396 | A1 * | 9/2006 | Laroia et al. ............... 455/422.1 |
| 2007/0082675 | A1 * | 4/2007 | Gruet et al. .................... 455/453 |

(Continued)

FOREIGN PATENT DOCUMENTS

| CN | 1227036 A | 8/1999 |
| CN | 1685745 A | 10/2005 |

(Continued)

OTHER PUBLICATIONS

Zhang et al (Support of Short Data Burst transmission to/from an MSS in Sleep Mode or Idle Mode; IEEE C802 16e-04/538; Nov. 4, 2004).*

(Continued)

*Primary Examiner* — Shaq Taha
*Assistant Examiner* — Kodzovi Acolatse
(74) *Attorney, Agent, or Firm* — James K. O'Hare

(57) ABSTRACT

Methods and apparatus for efficiently communicating small amounts of information relatively frequently in a wireless communications system are described. An access point's uplink timing frequency structure includes a set of dedicated uplink communications resources, e.g., expression advertisement interval air link resources, which may be in addition to regular traffic channel resources. The set of dedicated uplink communications resources comprises a small fraction of the total uplink communications resources. An individual one of the set of dedicated uplink communications resources can carry a small amount of information bits. An expression advertisement interval occurs relatively frequently. A wireless communications device, registered with the access point, is allocated one of the set of dedicated uplink resources. The wireless communications device can transmit information using its allocated resource in both a sleep state and an active state.

21 Claims, 23 Drawing Sheets

(56) References Cited

U.S. PATENT DOCUMENTS

| | | |
|---|---|---|
| 2007/0218889 A1* | 9/2007 | Zhang et al. ............ 455/422.1 |
| 2008/0002692 A1 | 1/2008 | Meylan et al. |
| 2008/0076382 A1 | 3/2008 | Girard et al. |
| 2008/0285473 A1 | 11/2008 | Chen et al. |
| 2009/0003467 A1 | 1/2009 | Chen |
| 2009/0135769 A1 | 5/2009 | Sambhwani et al. |
| 2010/0272081 A1 | 10/2010 | Laroia et al. |

FOREIGN PATENT DOCUMENTS

| | | |
|---|---|---|
| CN | 101370255 A | 2/2009 |
| EP | 1511246 A2 | 3/2005 |
| JP | 2009531973 A | 9/2009 |
| JP | 2010541492 A | 12/2010 |
| KR | 20050024086 A | 3/2005 |
| KR | 20080048727 A | 6/2008 |
| WO | WO-2007111941 | 10/2007 |

OTHER PUBLICATIONS

International Search Report and Written Opinion—PCT/US2010/032009, International Search Authority—European Patent Office—Aug. 19, 2010.

Taiwan Search Report—TW099112732—TIPO—Feb. 18, 2013.

* cited by examiner

METHODS AND APPARATUS FOR COMMUNICATING INFORMATION

FIELD

Various embodiments relate to wireless communications, and more particularly, to methods and apparatus which can be used to communicate low bit count data information transfers in a wireless communications system.

BACKGROUND

Location-based applications such as "Loopt" running on mobiles in a wide-area-network require frequent updates of very short messages to be transmitted by mobiles to the access point, e.g., base-station, in the uplink and by the access point to the mobiles in the downlink. Since the location updates are on the order of few tens of bits but must be transmitted and received every few seconds, it is very costly, in terms of control messaging overhead, to require that this information exchange take place using the regular wide-area-network traffic channels. In addition to location updates, in various other types of applications, e.g., social networking applications utilizing localized peer to peer communications for primary communications, there are also needs to communicate relatively small amounts of information relatively frequently in an efficient manner. For example, it may be advantageous to be able to communicate small amounts of peer discovery information in a local region in such a manner. While transmission of data by mobiles in what is known as an active state where mobiles have dedicated resources including, e.g., data traffic channel resources, the number of devices that can be supported in an active state at any given time is relatively limited. To increase the number of devices which can be supported WAN systems also normally support a sleep state in which a device is not subject to closed loop timing and/or closed loop power control and also lack dedicated traffic channel resources. In a typical wide-area-network, there may be thousands of mobiles in a "sleep" state at any given time. Mobiles in a sleep state normally lack dedicated channels for traffic data and normally must transition to the "active" state through a complex hand-shaking procedure in order to be assigned dedicated traffic channel resources prior to sending or receiving meaningful data including very short messages of the type discussed above. Thus, the overhead associated with sending short messages for devices in a sleep state can be considerable due to the resources required to enable the transition to an active state.

Based on the above discussion there is a need for methods and apparatus which provide an efficient means of communicating small amount of information frequently in a wireless communications system. It would be advantageous if such methods did not require large amounts of signaling overhead. In addition, it would be desirable if some methods and apparatus were scalable, e.g., capable of supporting implementations with small numbers of users as well as implementations with large numbers of users.

SUMMARY

Methods and apparatus well suited for efficiently communicating small amounts of information relatively frequently in a wireless communications system are described. In accordance with one aspect, an uplink timing frequency structure for an access point includes a set of dedicated uplink communications resources, e.g., expression advertisement interval air link resources. The set of dedicated uplink communications resources comprises a relatively small fraction of the total uplink communications resources in the uplink timing frequency structure for the access point. In some embodiments, a wireless communications device registers with the access point and obtains an expression advertisement resource identifier associated with one of the set of dedicated uplink communications resources. An individual one of the set of dedicated uplink communications resources can carry a small amount of information bits. An expression advertisement interval recurs relatively frequently, e.g., as compared to a network registration update interval. The wireless communications device is allowed to use its dedicated uplink communications resource irrespective as to whether the wireless communications device is in a sleep state or active state. Thus, in some embodiments, a wireless communications device has dedicated resources for transmitting a small amount of data regardless of its state of operation, e.g., sleep or active, with regard to a wide area network access point through which it can communicate data. The access point receives signals communicated over the dedicated uplink communications resources from a plurality of wireless communications devices currently registered with the access point and processes the received information. The number of devices the access point serves via dedicated expression advertisement interval air link resources may exceed the maximum number of devices in an active state and sleep state combined that can be supported at a given time by the access point.

An exemplary method of operating an access point, in accordance with some embodiments, comprises: receiving information from a first wireless communications device in a first uplink communications resource while said first wireless communications device is operating in a sleep state with respect to the access point, said first uplink communications resource being dedicated to the first wireless communications device; and processing the received information. An exemplary access point, in accordance with some embodiments, comprises: at least one processor configured to: receive information from a first wireless communications device in a first uplink communications resource while said first wireless communications device is operating in a sleep state with respect to the access point, said first uplink communications resource being dedicated to the first wireless communications device; and process the received information. The exemplary access point further includes memory coupled to said at least one processor.

An exemplary method of operating a first wireless communications device, in accordance with some embodiments, comprises: generating a first information signal to be communicated to an access point; and transmitting the first information signal to the access point in a first uplink communications resource while said wireless communications device is operating in a sleep state with respect to the access point, said first uplink communications resource being dedicated to the first wireless communications device. An exemplary first wireless communications device, in accordance with some embodiments, comprises: at least one processor configured to: generate a first information signal to be communicated to an access point; and transmit the first information signal to the access point in a first uplink communications resource while said wireless communications device is operating in a sleep state with respect to the access point, said first uplink communications resource being dedicated to the first wireless communications device. The exemplary first wireless communications device further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
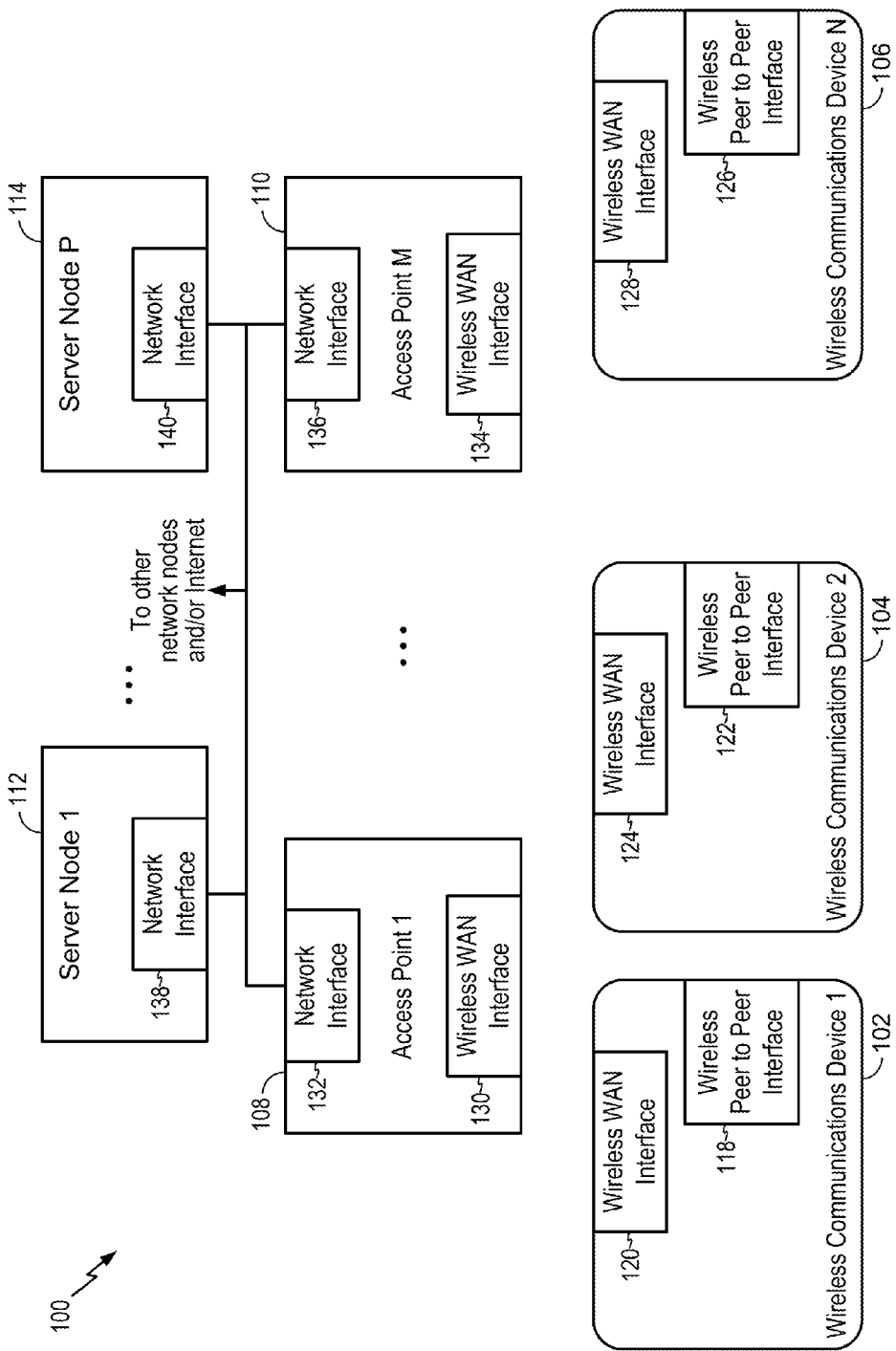
FIG. 1 is a drawing of an exemplary communications system in accordance with an exemplary embodiment.

FIG. 1 is a drawing of an exemplary communications system 100 including a plurality of wireless communications devices (wireless communications device 1 102, wireless communications device 2 104, . . . , wireless communications device N 106), a plurality of access points (access point 1 108, . . . , access point M 110), and a plurality of server nodes (server node 1 112, . . . , server node P 114). The exemplary wireless communications devices (102, 104, 106) include wireless peer to peer interfaces (118, 122, 126), respectively, and wireless wide area network interfaces (120, 124, 128), respectively.

The exemplary access points (108, 110) include wireless wide area network interfaces (130, 134), respectively, and network interfaces (132, 136), respectively. The exemplary server nodes (112, 114) include network interfaces (138, 140), respectively. The exemplary network interfaces (132, 136, 138, 140) are coupled together via a backhaul network 116 which couples the nodes (108, 110, 112, 114) together and to other network nodes and/or the Internet.

In some embodiments at least some of access points (108, . . . , 110) are base stations. In some embodiments, at least one of the server nodes (112, 114) is used to store and/or track location information regarding at least some of the wireless communications devices (102, 104, . . . , 106). In some embodiments, at least one of the server nodes (112, 114) is used to store and/or track shopping preference information regarding at least some of the wireless communications devices (102, 104, . . . , 106).

The wireless wide area network interfaces (120, 124, 128, 130, 134) are, in some embodiments, part of a cellular network. The wireless peer to peer interfaces (118, 122, . . . , 126) in some embodiments use device to device signaling. In some embodiments, wireless communications over the cellular network use one of orthogonal frequency division multiplexing (OFDM) based wireless signaling, code division multiple access (CDMA) based wireless signaling and global system for mobile communications (GSM) based wireless signaling, and the wireless communications over the peer to peer interfaces use OFDM based wireless signaling. In some embodiments, the wide area network communications band signaling uses a mixture of different types of signaling, e.g., for different purposes. For example, in one exemplary embodiment, the WAN traffic channel signaling, closed loop power control signaling and closed loop timing control signaling use CDMA based signaling, while the expression advertisement interval signaling and the expression broadcast interval signaling use OFDM based signaling. In some embodiments, the maximum signaling range for the peer to peer interface signaling is less than the maximum signaling range for the wide area network interface signaling.

The wireless communications devices (102, 104, . . . , 106) include stationary and mobile wireless communications devices. Exemplary mobile wireless communications devices includes cell phones with peer to peer capability and laptop computers with peer to peer capability, and other types of wireless communications devices including both a wireless WAN interface and a peer to peer interface. The access points (108, . . . , 110) include fixed location base stations.

Figure 2A:
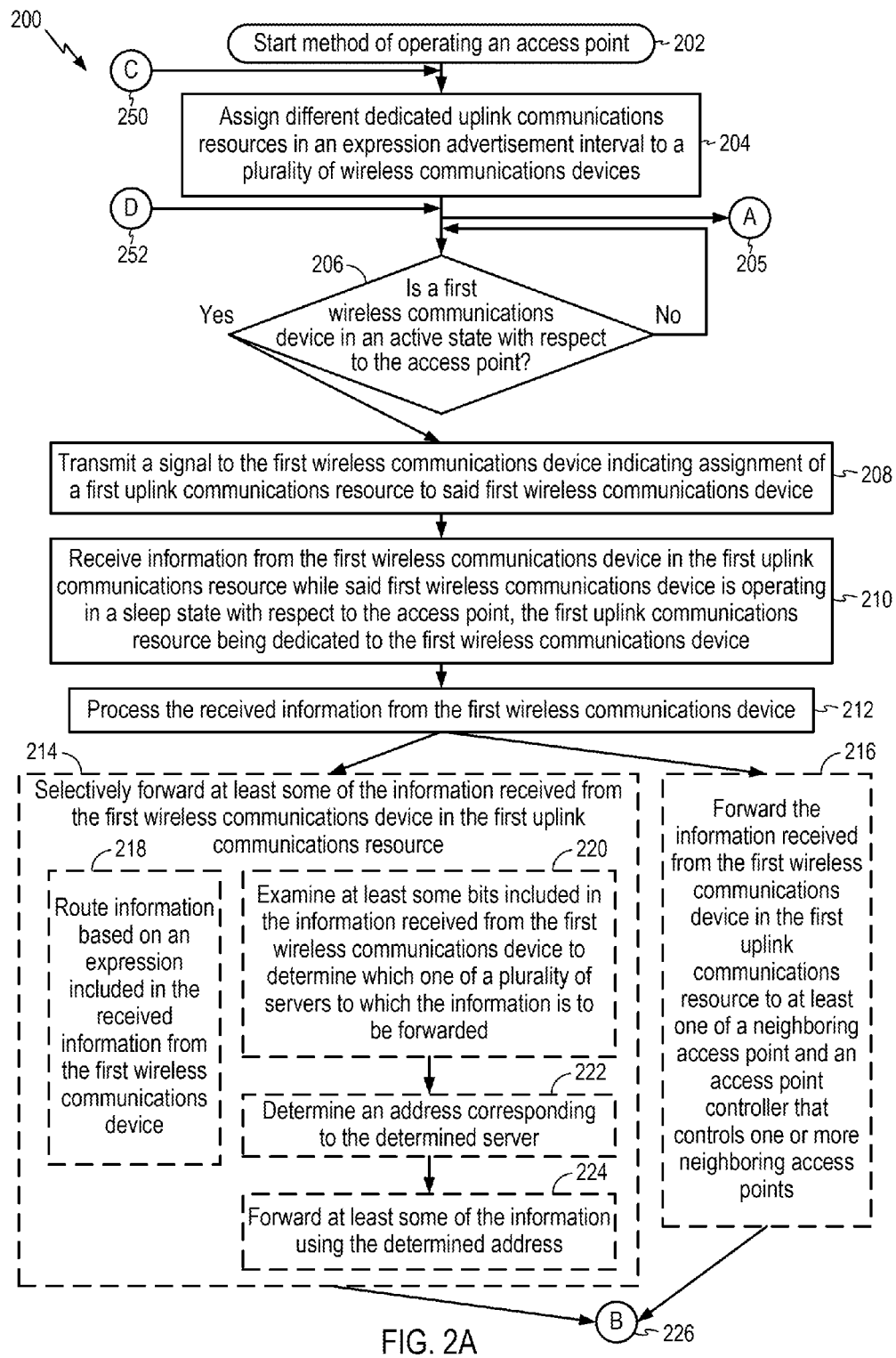
FIG. 2A is a first part of a flowchart of an exemplary method of operating access point in accordance with an exemplary embodiment.
Figure 2B:
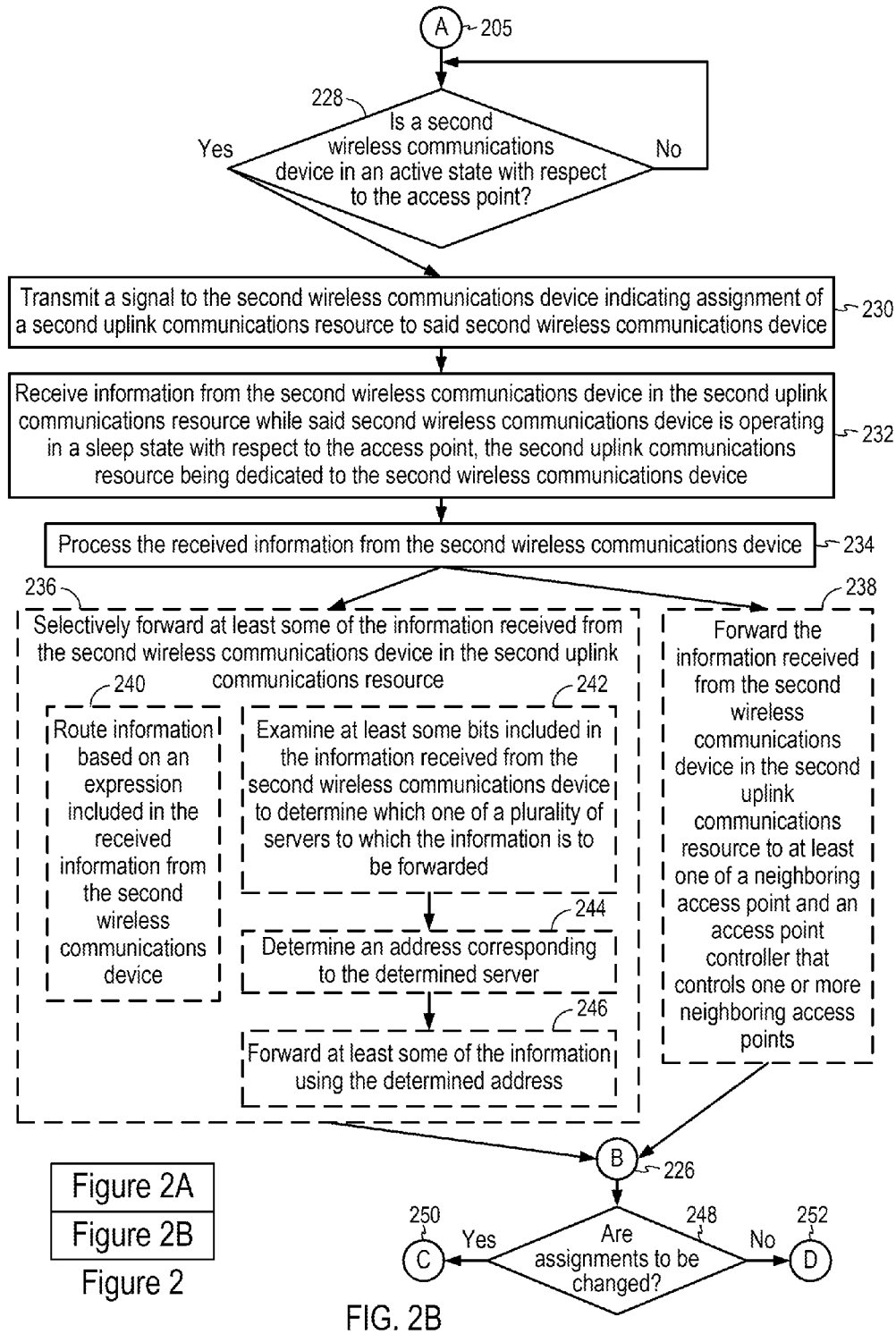
FIG. 2B is a second part of a flowchart of an exemplary method of operating access point in accordance with an exemplary embodiment.

FIG. 2, comprising the combination of FIG. 2A and FIG. 2B, is a flowchart 200 of an exemplary method of operating an access point in accordance with an exemplary embodiment. The exemplary access point is, e.g., one of the access points in system 100 of FIG. 1. Operation starts in step 202, where the access point is powered on and initialized. Operation proceeds from start step 202 to step 204.

In step 204, the access point assigns different dedicated uplink communications resources in an expression advertisement interval to a plurality of wireless communications devices. Operation proceeds from step 204 to step 206 and to step 228 via connecting node A 205. In step 206 the access point determines if a first wireless communications device is in an active state with respect to the access point. If the first wireless communications device is not in active state with respect to the access point, then operation returns to the input of step 206 for another check. However, if the first wireless communications device is in an active state with respect to the access point, then operation proceeds from step 206 to step 208.

In step 208 the access point transmits a signal to the first communications device indicating assignment of a first uplink communications resource to the first wireless communications device. Then in step 210 the access point receives information from the first wireless communications device in the first uplink communications resource while said first wireless communications device is operating in a sleep state with respect to the access point, the first uplink communications resource being dedicated to the first wireless communications device.

In some embodiments, when the first wireless communications device is operating in a sleep state with respect to the access point, there is no closed loop power control and no closed loop timing control of the first wireless communications device by the access point. In various embodiments, the first uplink communications resource is part of a set of dedicated resources corresponding to an expression advertisement interval. In some such embodiments, the expression advertisement interval recurs in accordance with a predetermined schedule. In some embodiments, the expression advertisement interval recurs at an average rate which is faster than an average network registration update rate of the first wireless communications device. A network registration update of the first wireless communications device, in some embodiments, includes the first wireless communications device sending a network element, e.g., a server, a signal indicating information about the first wireless communications device, e.g., information indicating location to be used for paging, etc. In various embodiments, the average rate for the expression advertisement interval is at least 10 times faster than the average network registration update rate. In some embodiments, the expression advertisement interval recurs with a spacing between successive expression advertisement intervals of less than one minute, while network registration updates occur with a spacing between successive registration updates of at least 10 minutes, e.g., 30 minutes to a few hours.

In various embodiments, the first uplink communications resource is a set of OFDM tone-symbols. An OFDM tone-symbol, in some embodiments, is the air link resource of one OFDM tone for one OFDM symbol transmission time interval. In some such embodiments, the location of the set of OFDM tone-symbols is determined according to a predetermined hopping function.

Operation proceeds from step 210 to step 212, in which the access point processes the received information from the first wireless communications device. Operation proceeds from step 212 to one of step 214 and step 216. In step 214 the access point selectively forwards at least some of the information received from the first wireless communications device in the first uplink communications resource. Step 214, in some embodiments, includes forwarding a subset of the received information which passes some filter constraint. In step 216 the access point forwards the information received from the first wireless communications device in the first uplink communications resource to at least one of a neighboring access point and an access point controller that controls one or more neighboring access point. A neighboring access point is, in some embodiments, an access point which is physically adjacent the access point implementing the method of flowchart 200.

In some embodiments, step 214 includes one or more of steps 218, 220, 222 and 224. In step 218 the access point routes information based on an expression included in the received information from the first wireless communications device. The expression is, e.g., an address of server.

In step 220 the access point examines at least some bits included from the information received from the first wireless communications device to determine which one of a plurality of servers to which the information is to be forwarded. Operation proceeds from step 220 to step 222. In step 222 the access point determines an address corresponding to the determined server. Operation proceeds from step 222 to step 224. In step 224 the access point forwards at least some of the information using the determined address. Operation proceeds from step 214 or step 216 to connecting node B 226.

Returning to step 228, in step 228 the access point determines if a second wireless communications device is in an active state with respect to the access point. If the second wireless communications device is not in an active state with respect to the access point, then operation proceeds from the output of step 228 back to the input of step 228 for another check at a later time. However, if the second communications is determined to be in an active state with respect to the access point, then operation proceeds from step 228 to step 230.

In step 230 the access point transmits a signal to the second wireless communications device indicating assignment of a second uplink communications resources while said second wireless communications device is operating in an active state with respect to the access point, the second uplink communications resource being dedicated to the second communications device. Then, in step 232 the access point receives information from the second wireless communications device in the second uplink communications resource while said second wireless communications device is operating in an active state with respect to the access point, the second uplink communications resource being dedicated to the second communications device.

In some embodiments, when the second wireless communications device is operating in an active state with respect to the access point, there is at least one of closed loop power control and closed loop timing control of the second wireless communications device by the access point. In some embodiments, when the second wireless communications device is operating in an active state with respect to the access point, there is both closed loop power control and closed loop timing control of the second wireless communications device by the access point. In various embodiments, the second uplink communications resource is part of a set of dedicated resources corresponding to an expression advertisement interval. In some such embodiments, the expression advertisement interval recurs in accordance with a predetermined schedule. In some embodiments, the expression advertisement interval recurs at an average rate which is faster than an average network registration update rate of the second wireless communications device. A network registration update of the second wireless communications device, in some embodiments, includes the second wireless communications device sending a network element, e.g., a server, a signal indicating information about the second wireless communications device, e.g., information indicating location to be used for paging, etc. In various embodiments, the average rate for the expression advertisement interval is at least 10 times faster than the average network update registration update rate. In some embodiments, the expression advertisement interval recurs with a spacing between successive expression advertisement intervals of less than one minute, while network registration updates occur with a spacing between successive registration updates of at least 10 minutes, e.g., 30 minutes to a few hours.

In various embodiments, the second uplink communications resource is a second set of OFDM tone-symbols. In some such embodiments, the location of the second set of OFDM tone-symbols is determined according to a predetermined hopping function.

Operation proceeds from step 232 to step 234. In step 234 the access point processes the received information from the second wireless communications device. Operation proceeds from step 234 to one of step 236 and step 238.

In step 236 the access point selectively forwards at least some of the information received from the second wireless communications device in the second uplink communications resource. For example, the selective forwarding may include forming a subset to forward based on passing some filter constraint. In step 238 the access point forwards the information received from the second wireless communications device in the second uplink communications resource to at least one of a neighboring access point and an access point controller that controls one or more neighboring access points, e.g., physically adjacent access points.

In some embodiments, step 236 includes one or more of steps 240, 242, 244 and 246. In step 240 the access point routes information based on an expression included in the received information from the second wireless communications device. The expression is, e.g., an address of server.

In step 242 the access point examines at least some bits included in the information received from the second wireless communications device to determine which one of a plurality of servers to which information is to be forwarded. Operation proceeds from step 242 to step 244, in which the access point determines an address corresponding to the determined server. Then, in step 246 the access point forwards at least some of the information received from the second wireless communications device in the second uplink communications resource using the determined address of step 244.

Operation proceeds from step 236 or step 238 to connecting node B 226.

Operation proceeds from connecting node B 226 to step 248. In step 248 the access node determines whether or not assignments for dedicated uplink communications resource in an expression advertisement interval are to be changed. If the assignments are to be changed, then operation proceeds from step 248 via connecting node C 250 to the input of step 204. However, if the assignments are not to be changed then operation proceeds from step 248 via connecting node D 252 to the input of step 206 and the input of step 228.

Figure 3:
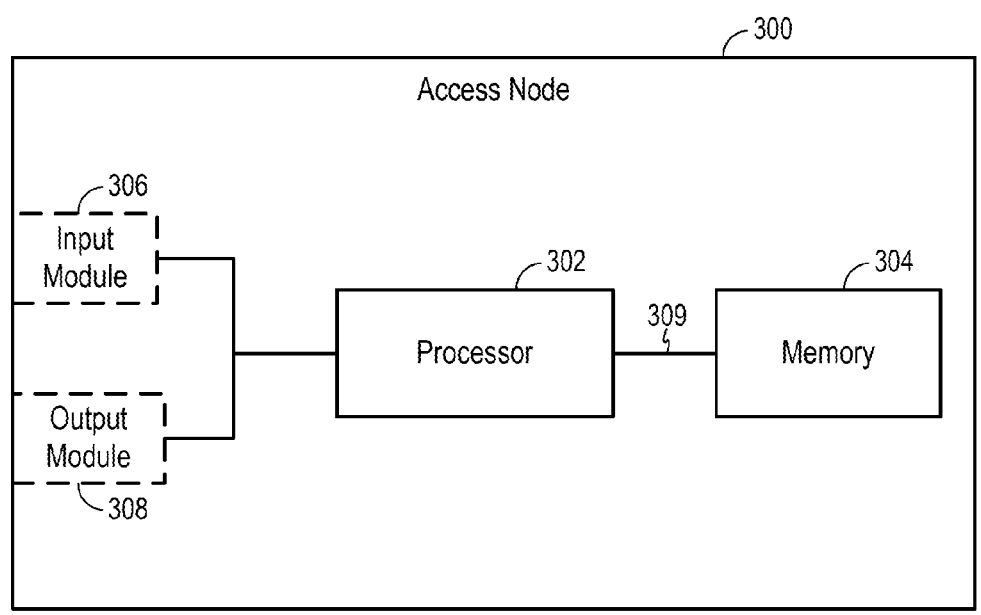
FIG. 3 is a drawing of an exemplary access point, in accordance with an exemplary embodiment.

FIG. 3 is a drawing of an exemplary access point 300, in accordance with an exemplary embodiment. Exemplary access point 300 is, e.g., one of the access points of FIG. 1. Exemplary access point 300 may, and sometimes does, implement a method in accordance with flowchart 200 of FIG. 2.

Access point 300 includes a processor 302 and memory 304 coupled together via a bus 309 over which the various elements (302, 304) may interchange data and information. Access point 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: receive information from a first wireless communications device in a first uplink communications resource while said first wireless communications device is operating in a sleep state with respect to the access point, said first uplink communications resource being dedicated to the first wireless communications device; and process the received information. Processor 302 is further configured to: receive information from a second wireless communications device in a second uplink communications resource while said second wireless communications device is operating in an active state with respect to the access point, said second uplink communications resource being dedicated to the second wireless communications device.

In some embodiments, said first uplink communications resource is part of a set of dedicated resources corresponding to an expression advertisement interval. In some embodiments, the first and second uplink communications resources are both parts of the same set of dedicated resources corresponding to the expression advertisement interval, and the first and second uplink communications resources are non-overlapping. In some embodiments, said expression advertisement interval recurs in accordance with a predetermined schedule. In various embodiments, the expression advertisement interval recurs at an average rate which is faster than an average network registration update rate of the first wireless communications device. In some embodiments, the average rate for the expression advertisement interval is at least 10 times faster than the average network update registration rate. In one embodiment, the interval between successive expression advertisement intervals is less than one minute, and the interval between network registration updates is in the range of 30 minutes to a few hours.

In some embodiments, the first uplink communications resource is a set of OFDM tone-symbols. In some such embodiments, the location of the set of OFDM tone-symbols is determined according to a predetermined hopping function. In some embodiments, the second uplink communications resource is a set of OFDM tone-symbols which is the same size as the first uplink communications resource.

Processor 302, in some embodiments, is further configured to: selectively forwarding at least some of the information received from the first wireless communications device in the first uplink communications resource, e.g., forwarding a subset of the received information which passes some filter constraint. Processor 302 may be, and sometimes is configured to: route information based on an expression included in the received information, e.g. an address of a server included in the received information, as part of being configured to selectively forward. Processor 302 may be, and sometimes is, configured to: examine at least some bits included in the information received from the first wireless communications device to determine which one of a plurality of servers to which the information is to be forwarded; determine an address corresponding to the determined server; and forward said at least some of the information using the determined address, as part of being configured to selectively forward.

Processor 302, in various embodiments, is configured to: forward the information received from the first wireless communications device in the first uplink communications resource to at least one of a neighboring access point and an access point controller that controls one or more neighboring access points. In some embodiments the neighboring access point is a physically adjacent access point with respect to access point 300. In some embodiment a neighboring access point is an access within a range of access point 300, e.g., within a predetermined range of access point 300. Processor 302 is, in some embodiments, configured to: transmit a signal to the first wireless communications device indicating assignment of the first uplink communications resource to said first wireless communications device, while said first wireless communications device is in an active state with respect to the access point.

Processor 302 is further configured to: assign different dedicated uplink communications resources in said expression advertisement interval to a plurality of different wireless communications devices. In various embodiments, a dedicated uplink communications resource in an expression advertisement interval assigned to a wireless communications device is to be used by the wireless communications device whether the wireless communications device is in a sleep state or an active state with respect to the access point.

FIG. 4 is an assembly of modules 400 which can, and in some embodiments is, used in the access point 300 illustrated in FIG. 3. The modules in the assembly 400 can be implemented in hardware within the processor 302 of FIG. 3, e.g., as individual circuits. Alternatively, the modules may be implemented in software and stored in the memory 304 of the access point 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of module 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the access point 300 or elements therein such as the processor 302, to perform the functions of the corresponding steps illustrated in the method flowchart 200 of FIG. 2.

Figure 4A:
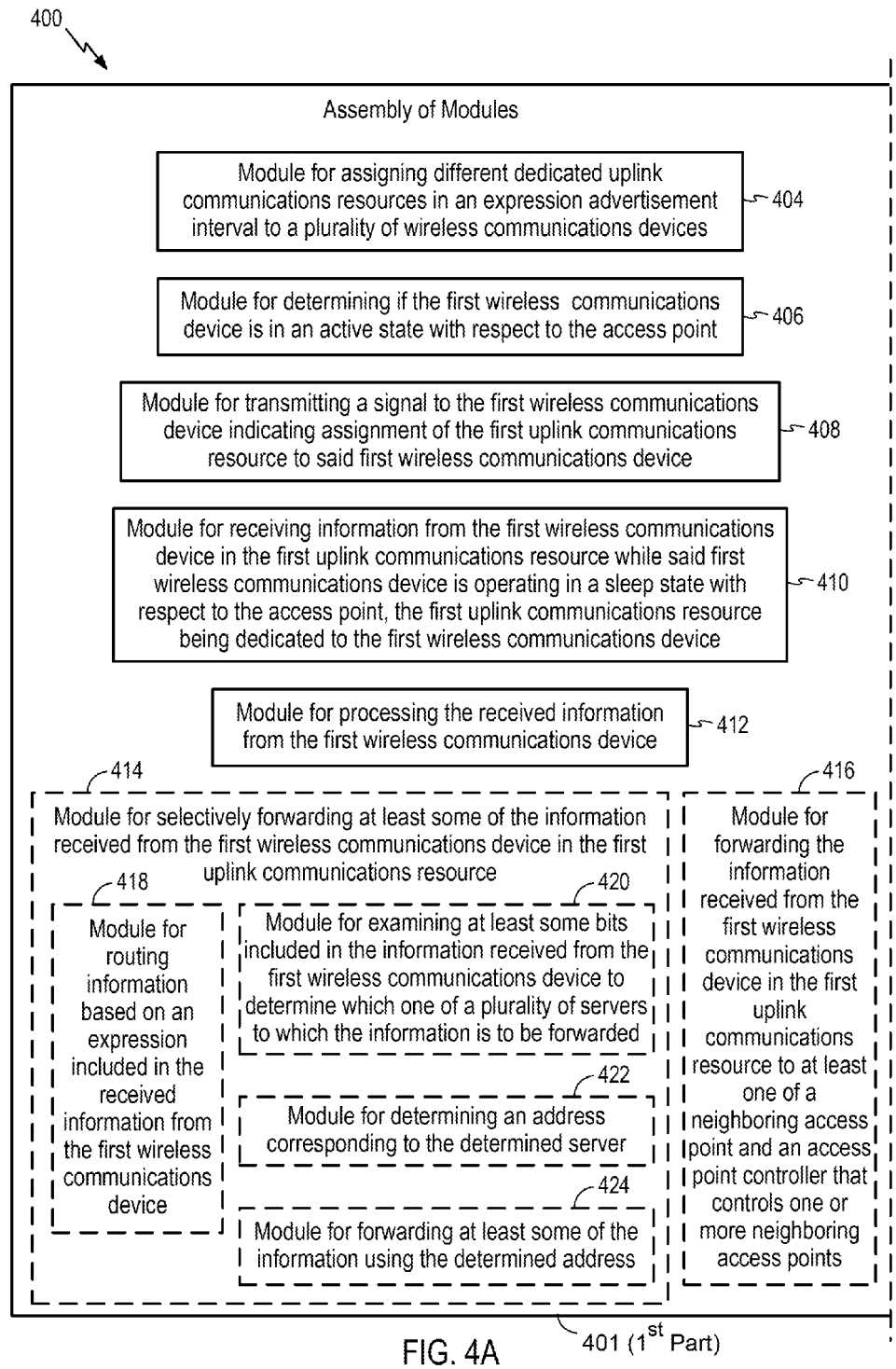
FIG. 4A is a first part of an assembly of modules which can, and in some embodiments is, used in the access point illustrated in FIG. 3.
Figure 4B:
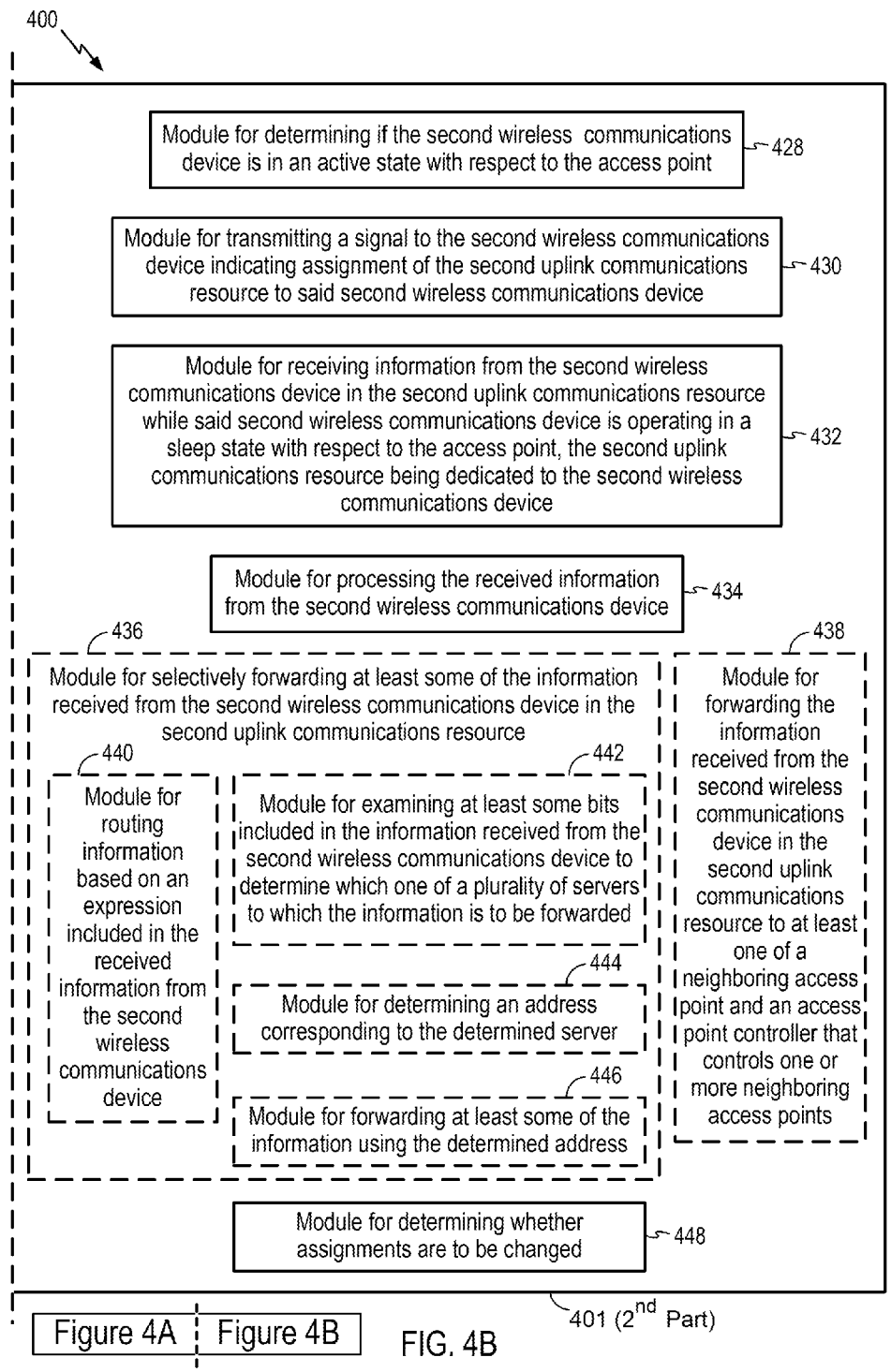
FIG. 4B is a second part of an assembly of modules which can, and in some embodiments is, used in the access point illustrated in FIG. 3.

As illustrated in FIG. 4, the assembly of modules 400, comprising first part 401 illustrated by FIG. 4A and second part 402 illustrated by FIG. 4B, includes: a module 404 for assigning different dedicated uplink communications resources in an expression advertisement interval to a plurality of wireless communications devices, a module 406 for determining if the first wireless communications device is in an active state with respect to the access point, a module 408 for transmitting a signal to the first wireless communications device indicating assignment of the first uplink communications resource to said first wireless communications device, a module 410 for receiving information from the first wireless communications device in the first uplink communications resource while said first wireless communications device is operating in a sleep state with respect to the access point, the first uplink communications resource being dedicated to the first wireless communications device, and a module 412 for processing the received information from the first wireless communications device.

In some embodiments, assembly of modules includes one or more of: a module 414 for selectively forwarding at least some of the information received from the first wireless communications device in the first uplink communications resource and a module 416 for forwarding the information received from the first wireless communications device in the first uplink communications resource to at least one of a neighboring access point and an access point controller that controls one or more neighboring access points. In various embodiments module 414 includes one or more of: a module 418 for routing information based on an expression included in the received information from the first wireless communications device, a module 420 for examining at least some bits included in the information received from the first wireless communications device to determine which one of a plurality of servers to which the information is to be forwarded, a module 422 for determining an address corresponding to the determined server, and a module 424 for forwarding at least some of the information using the determined address from module 422.

Assembly of modules 400 further includes a module 428 for determining if the second wireless communications device is in active state with respect to the access point, a module 430 for transmitting a signal to the second wireless communications device in the second uplink communications resource while said second wireless communications device is operating in an active state with respect to the access point, the second uplink communications resource being dedicated to the second communications device, a module 432 for receiving information from the second wireless communications device in the second uplink communications resource while said second wireless communications device is operating in an active state with respect to the access point, the second uplink communications resource being dedicated to the second communications device, and a module 434 for processing the received information from the second wireless communications device, and a module 448 for determining whether assignments are to be changed. In some embodiments, the assembly of modules includes one or more of: a module 436 for selectively forwarding at least some of the information received from the second communications device in the second uplink communications resource and a module 438 for forwarding the information received from the second communications device in the second uplink communications resource to at least one of a neighboring access point and an access point controller that controls one or more neighboring access points. In various embodiments, module 436 includes one or more of: a module 440 for routing information based on an expression included in the received information from the second wireless communications device, a module 442 for examining at least some bits included in the information received from the second wireless communications device to determine which one of a plurality of servers to which the information is to be forwarded, a module 444 for determining an address corresponding to the determined server, and a module 446 for forwarding at least some of the information using the determined address from module 444.

Figure 5:
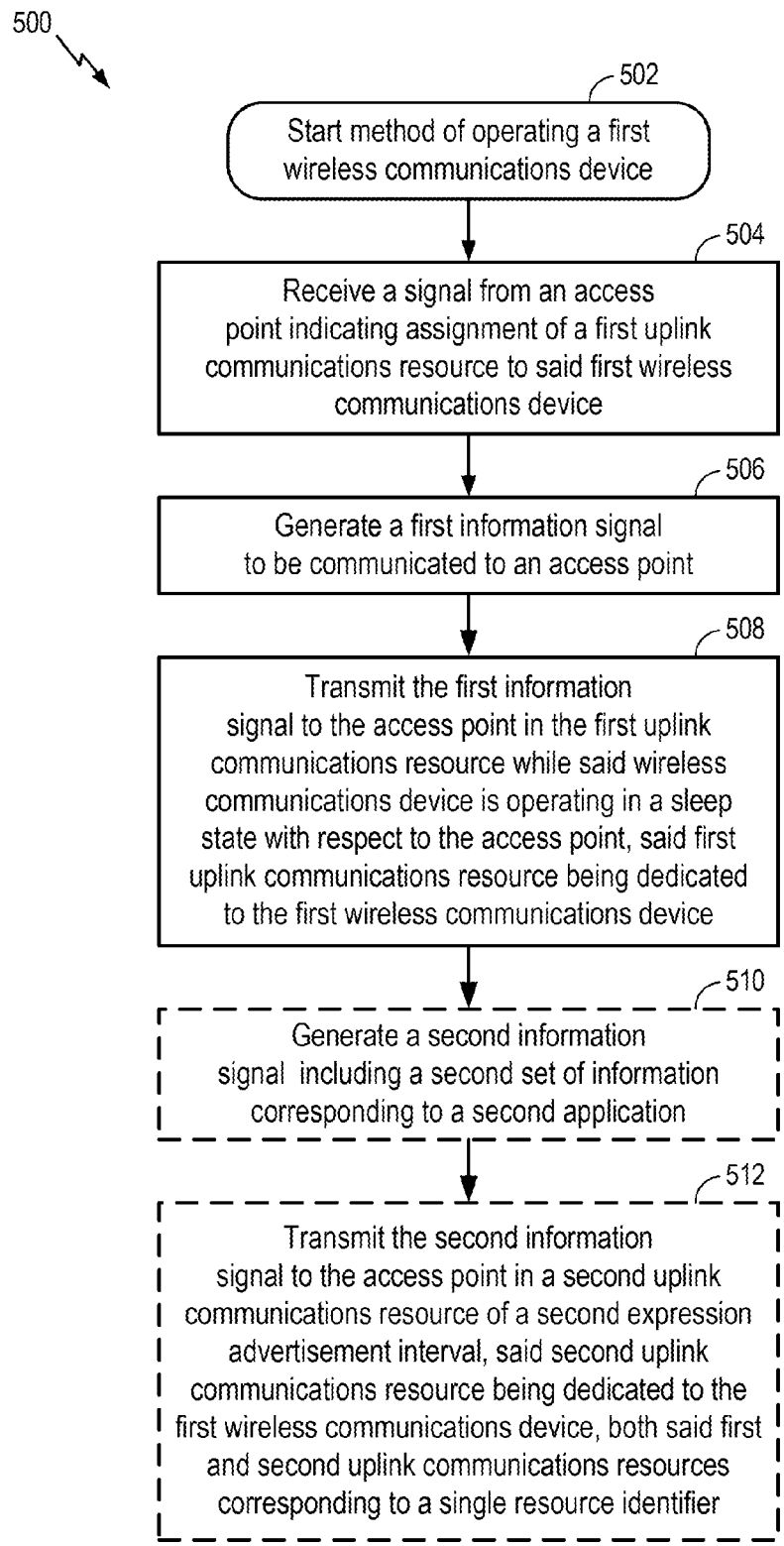
FIG. 5 is a flowchart of an exemplary method of operating a first wireless communications device in accordance with an exemplary embodiment.

FIG. 5 is a flowchart 500 of an exemplary method of operating a first wireless communications device in accordance with an exemplary embodiment. The first wireless communications device is, e.g., one of the wireless communications devices of system 100 of FIG. 1. Operation starts in step 502 where the first wireless communications device is powered on and initialized and proceeds to step 504. In step 504, the first wireless communications device receives a signal from an access point indicating assignment of a first uplink communications resources to said first wireless communications device.

Operation proceeds from step 504 to step 506. In step 506 the first wireless communications device generates a first information signal to be communicated to the access point. Then, in step 508 the first wireless communications device transmits the first information signal to the access point in the first uplink communications resource while said wireless communications device is operating in a sleep state with respect to the access point, said first uplink communications resource being dedicated to the first wireless communications device. In some embodiments, when the first wireless communications device is operating in a sleep state with respect to the access point, there is no closed loop power control and no closed loop timing control of the first wireless communications device by the access point.

In some embodiments, the first uplink communications resource is part of a set of dedicated resources corresponding to an expression advertisement interval. In some such embodiments, the expression advertisement interval recurs in accordance with a predetermined schedule. In various embodiments, the expression advertisement interval recurs at an average rate which is faster than an average network registration update of the first wireless communications device. The network registration update of the first wireless communications device, in some embodiments, refers to the first wireless communications device sending a signal to a network element, e.g., a server, with the signal indicating first wireless communications device update information, e.g., a current location for paging, etc. In some embodiments, the average rate for the expression advertisement interval is at least ten times faster than the average network registration update rate. In some embodiments, the expression advertisement interval recurs with a spacing between successive expression advertisement intervals of less than one minute, while network registration updates occur with a spacing between successive registration updates of at least 10 minutes, e.g., 30 minutes to a few hours.

In some embodiments, the first uplink communications resource is a set of OFDM tone-symbols. In some such embodiments, the location of the set of OFDM tone-symbols is determined according to a predetermined hopping function.

In some embodiments, optional steps 510 and 512 are included. In one embodiment which includes step 510 and step 512, the first information signal of steps 506 and 508 includes a first set of information corresponding to a first application and the first information signal is transmitted in a first expression advertisement interval.

Operation proceeds from step 508 to step 510, when included. In step 510 the first communications device generates a second information signal including a second set of information corresponding to a second application. Then, in step 512 the first communications device transmits the second information signal to the access point in a second uplink communications resource of a second expression advertisement interval, said second uplink communications resource being dedicated to the first wireless communications device, both said first and second uplink communications resources corresponding to a single device identifier. In some embodiments, the signal of step 504 communicates the single device identifier.

Figure 6:
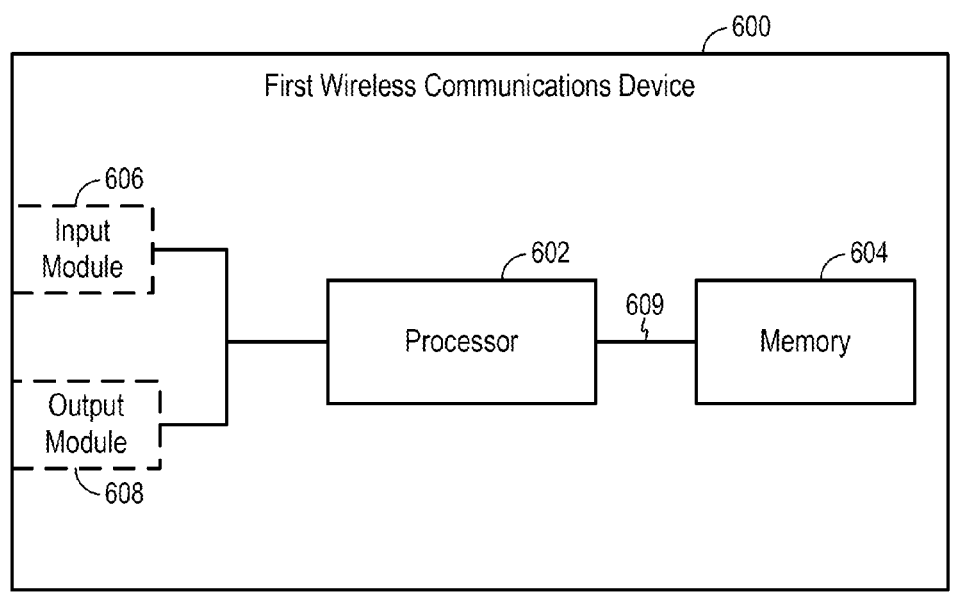
FIG. 6 is a drawing of an exemplary first wireless communications device, in accordance with an exemplary embodiment.

FIG. 6 is a drawing of an exemplary first wireless communications device 600, in accordance with an exemplary embodiment. Exemplary first wireless communications device 600 is, e.g., one of the wireless communications devices of FIG. 1. Exemplary first wireless communications device 600 may, and sometimes does, implement a method in accordance with flowchart 500 of FIG. 5.

First wireless communications device 600 includes a processor 602 and memory 604 coupled together via a bus 609 over which the various elements (602, 604) may interchange data and information. First wireless communications device 600 further includes an input module 606 and an output module 608 which may be coupled to processor 602 as shown. However, in some embodiments, the input module 606 and output module 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output.

Processor 602 is configured to: generate a first information signal to be communicated to an access point; and transmit the first information signal to the access point in a first uplink communications resource while said wireless communications device is operating in a sleep state with respect to the access point, said first uplink communications resource being dedicated to the first wireless communications device.

In some embodiments, the first uplink communications resource is part of a set of dedicated resources corresponding to an expression advertisement interval. In some such embodiments, said expression advertisement interval recurs in accordance with a predetermined schedule. In some embodiments, the expression advertisement interval recurs at an average rate which is faster than an average network registration update of the first wireless communications device. In at least one embodiment, the average rate is at least 10 times faster than the average network registration update rate.

In some embodiments, the first uplink communications resource is a set of OFDM tone-symbols. In some such embodiments, the location of the set of OFDM tone-symbols is determined according to a predetermined hopping function.

Processor 602 is further configured to: receive a signal from the access point indicating assignment of the first uplink communications resource to said first wireless communications device.

In some embodiments, the first information signal includes a first set of information corresponding to a first application and the first information signal is transmitted in a first expression advertisement interval, and processor 602 is further configured to: generate a second information signal including a second set of information corresponding to a second application; and transmit the second information signal to the access point in a second uplink communications resource of a second expression advertisement interval, said second uplink communications resource being dedicated to the first wireless communications device, both said first and second uplink communications resources corresponding to a single resource identifier.

Figure 7:
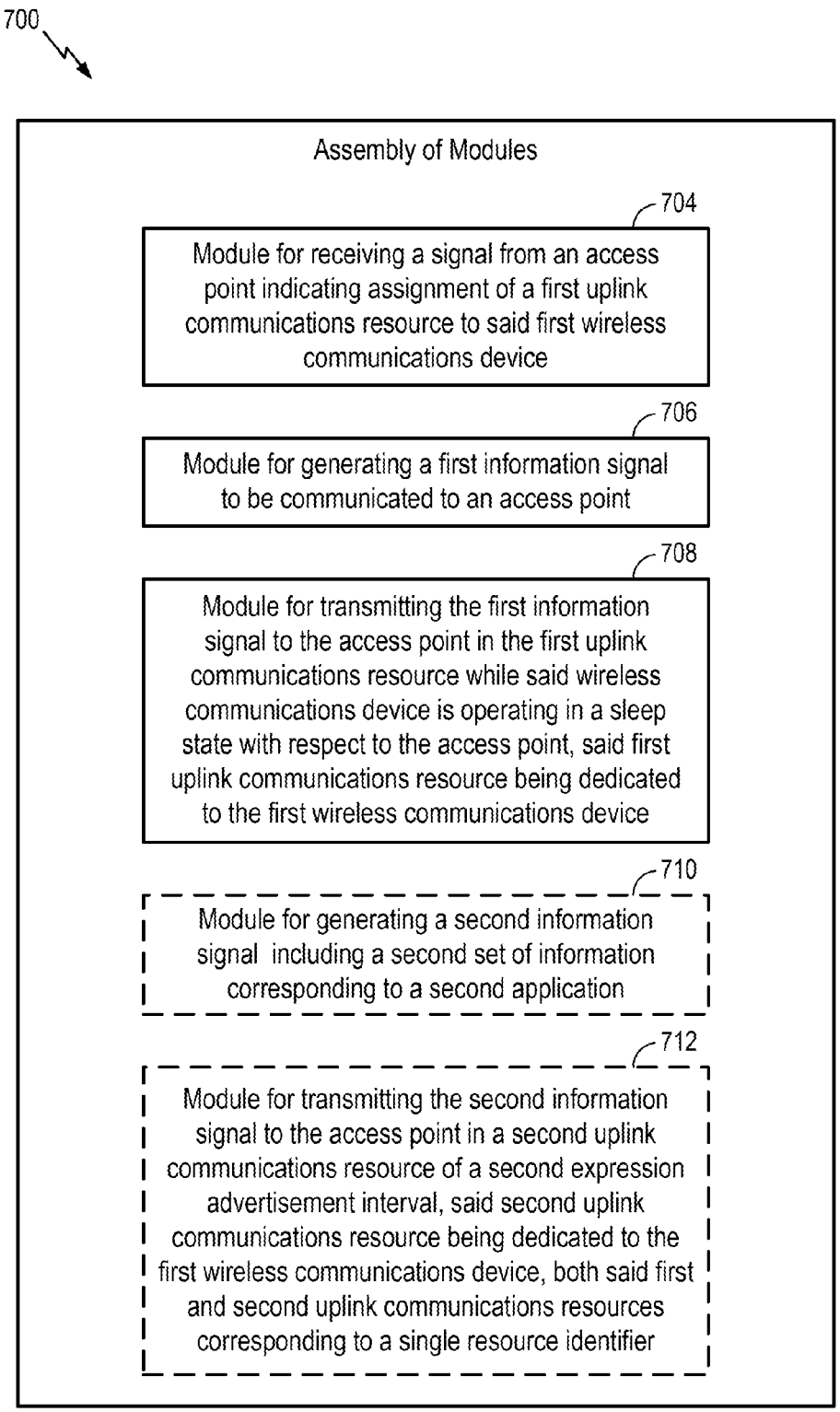
FIG. 7 is an assembly of modules which can, and in some embodiments is, used in the first wireless communications device illustrated in FIG. 6.

FIG. 7 is an assembly of modules 700 which can, and in some embodiments is, used in the first wireless communications device 600 illustrated in FIG. 6. The modules in the assembly 700 can be implemented in hardware within the processor 602 of FIG. 6, e.g., as individual circuits. Alternatively, the modules may be implemented in software and stored in the memory 604 of the access point 600 shown in FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In some embodiments, processor 602 is configured to implement each of the modules of the assembly of module 700. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the access point 600 or elements therein such as the processor 602, to perform the functions of the corresponding steps illustrated in the method flowchart 500 of FIG. 5.

As illustrated in FIG. 7, the assembly of modules 700 includes: a module 704 for receiving a signal from an access point indicating assignment of a first uplink communications resources to said first wireless communications device, a module 706 for generating a first information signal to be communicated to an access point, and a module 708 for transmitting the first information signal to the access point in the first uplink communications resource while said first wireless communications device is operating in a sleep state with respect to the access point, said first uplink communications resource being dedicated to the first wireless communications device.

In some embodiments, the first uplink communications resource is part of a set of dedicated resources corresponding to an expression advertisement interval. In some such embodiments, the expression advertisement interval recurs in accordance with a predetermined schedule. In various embodiments, the expression advertisement interval recurs at an average rate which is faster than an average network registration update of the first wireless communications device.

The network registration update of the first wireless communications device, in some embodiments, refers to the first wireless communications device sending a signal to a network element, e.g., a server, with the signal indicating first wireless communications device update information, e.g., a current location for paging, etc. In some embodiments, the average rate for the expression advertisement interval is at least ten times faster than the average network registration update rate. In some embodiments, the expression advertisement interval recurs with a spacing between successive expression advertisement intervals of less than one minute, while network registration updates occur with a spacing between successive registration updates of at least 10 minutes, e.g., 30 minutes to a few hours.

In some embodiments, the first uplink communications resource is a set of OFDM tone-symbols. In some such embodiments, the location of the set of OFDM tone-symbols is determined according to a predetermined hopping function.

In some embodiments assembly of modules 700 includes optional modules 710 and 712. In one embodiment which includes module 710 and module 712, the first information signal generated by module 706 and transmitted by module 708 includes a first set of information corresponding to a first application, and the first information signal is transmitted by module 708 in a first expression advertisement interval.

Module 710 is a module for generating a second information signal including a second set of information corresponding to a second application. Module 712 is a module for transmitting the second information signal to the access point in a second uplink communications resource of a second expression advertisement interval, said second uplink communications resource being dedicated to the first wireless communications device, both said first and second communications resources corresponding to a single resource identifier.

Figure 8:
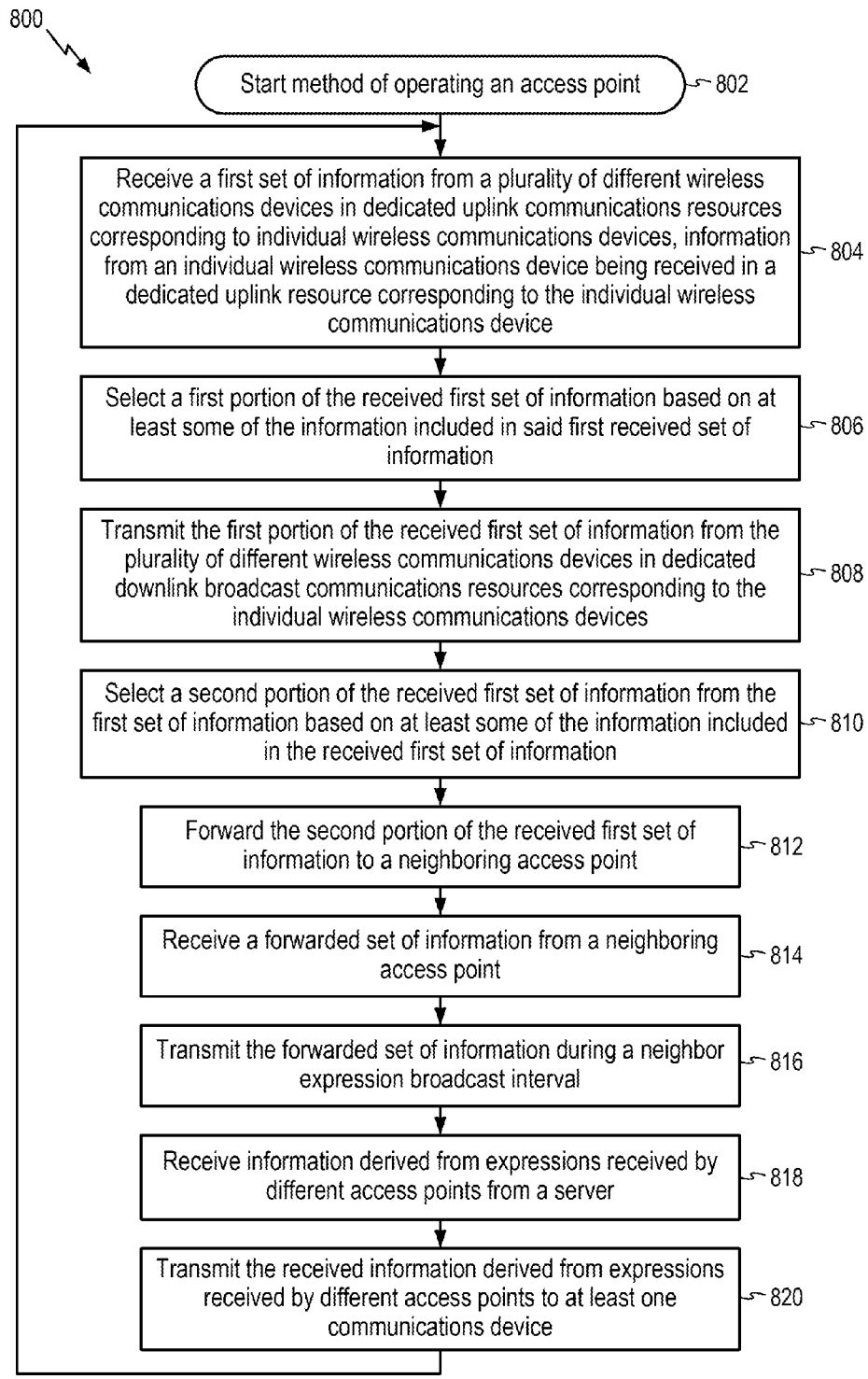
FIG. 8 is a flowchart of an exemplary method of operating an access point in accordance with an exemplary embodiment.

FIG. 8 is a flowchart 800 of an exemplary method of operating an access point in accordance with an exemplary embodiment. The access point is, e.g., one of the access point of system 100 of FIG. 1. Operation of the exemplary method starts in step 802 where the access point is powered on and initialized and proceeds to step 804. In step 804, the access point receives a first set of information from a plurality of different wireless communications devices in dedicated uplink communications resources corresponding to individual wireless communications devices, information from an individual wireless communications device being received in a dedicated uplink resource corresponding to the individual wireless communications device.

In some embodiments, a dedicated uplink communications resource corresponding to an individual wireless communications device is a set of OFDM tone-symbols. In some such embodiments, the location of the set of OFDM tone-symbols is determined according to a predetermined hopping function.

In some embodiments, the first set of information includes information transmitted by at least one wireless communications device operating in a sleep state with respect to the access point. In some such embodiments, the first set of information also includes information transmitted by at least one wireless communications device operating in an active state with respect to the access point.

In various embodiments, the first set of information is received during an expression advertisement interval. In some such embodiments, the expression advertisement interval recurs in accordance with a predetermined schedule.

Operation proceeds from step 804 to step 806. In step 806 the access point selects a first portion of the received first set of information based on at least some of the information included in said first received set of information. In some embodiments, the first portion is the entire received first set of information.

Operation proceeds from step 806 to step 808. In step 808 the access point transmits the first portion of the received first set of information from the plurality of different wireless communications devices in dedicated downlink broadcast communications resources corresponding to the individual wireless communications devices. In some embodiments, the access point transmits the first portion of the received first set of information during an expression broadcast interval. In some such embodiments, the expression broadcast interval recurs in accordance with a predetermined schedule.

In some embodiments, the expression advertisement interval occurs at a first rate and the expression broadcast interval recurs at a first rate at least as fast as the first rate. In some such embodiments, the access point can, and sometimes does, retransmit information received in an expression advertisement interval multiple times, e.g., during successive expression broadcast intervals. In some such embodiments, wireless communications devices, e.g., battery powered mobile nodes, transmitting during the expression advertisement interval may be powered constrained, whereas an access point, e.g., a fixed location base station, transmitting during expression broadcast intervals may not be power constrained.

In some embodiments, the expression advertisement interval recurs at an average rate which is faster than an average registration update rate for a wireless communications device. In some such embodiments, the average rate is at least 10 times faster than the average network registration update rate.

Operation proceeds from step 808 to step 810. In step 810 the access point selects a second portion of the received first set of information from the first set of information based on at least some of the information included in the received first set of information. Operation proceeds from step 810 to step 812. In step 812 the access point forwards the second portion of the first set of information to a neighboring access point. Operation proceeds from step 812 to step 814.

In step 814 the access point receives a forwarded set of information from a neighboring access point. In some embodiments, the forwarded information was received by the neighboring access point during an expression advertisement interval. Operation proceeds from step 814 to step 816. In step 816 the access point transmits the forwarded set of information during a neighbor expression broadcast interval. In some embodiments, expression broadcast intervals and neighbor expression broadcast intervals can overlap in time. In some embodiments, during at least some times, information received from multiple neighboring access points by said access point is transmitted by said access point during said neighbor expression broadcast interval. Operation proceeds from step 816 to step 818.

In step 818 the access point receives information derived from expressions received by different access points from a server. Then, in step 820 the access point transmits the received information derived from the expressions received by different access points to at least one communications device. Operation proceeds from step 820 to the input of step 804.

Figure 9:
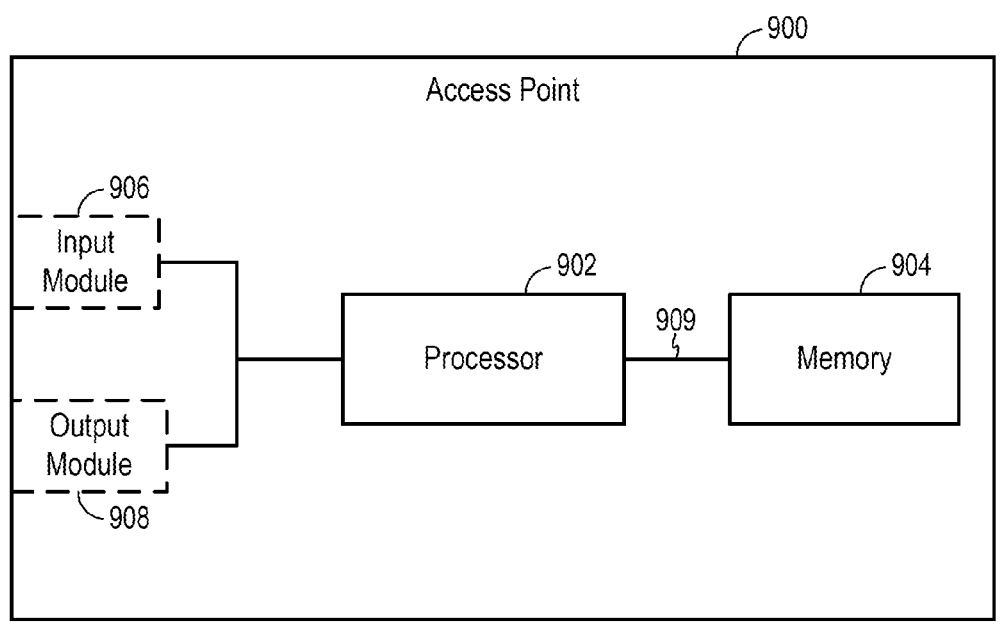
FIG. 9 is a drawing of an exemplary access point, in accordance with an exemplary embodiment.

FIG. 9 is a drawing of an exemplary access point 900, in accordance with an exemplary embodiment. Exemplary access point 900 is, e.g., one of the access points of FIG. 1.

Exemplary access point 900 may, and sometimes does, implement a method in accordance with flowchart 800 of FIG. 8.

Access point 900 includes a processor 902 and memory 904 coupled together via a bus 909 over which the various elements (902, 904) may interchange data and information. Access point 900 further includes an input module 906 and an output module 908 which may be coupled to processor 902 as shown. However, in some embodiments, the input module 906 and output module 908 are located internal to the processor 902. Input module 906 can receive input signals. Input module 906 can, and in some embodiments does, include a wireless receiver and/or a wired or optical input interface for receiving input. Output module 908 may include, and in some embodiments does include, a wireless transmitter and/or a wired or optical output interface for transmitting output.

As illustrated in FIG. 9, processor 902 is configured to: receive a first set of information from a plurality of different wireless communications devices in dedicated uplink resources corresponding to individual wireless communications devices, information from an individual wireless communications device being received in a dedicated uplink resource corresponding to the individual wireless communications device; and transmit a first portion of the received first set of information from the plurality of different wireless communications devices in dedicated downlink broadcast communications resources corresponding to the individual wireless communications devices. In some embodiments, the first portion is the entire received first set of information.

In some embodiments, said first set of information includes information transmitted by at least one wireless communications device operating in a sleep state with respect to the access point. In some such embodiments, said first set of information also includes information transmitted by at least one wireless communications device operating in an active state with respect to the access point.

In various embodiments, said first set of information is received during an expression advertisement interval. In some such embodiments, the expression advertisement interval recurs in accordance with a predetermined schedule.

Processor 902, in some embodiments, is further configured to: select said first portion of the received first set of information from the first set of information based on at least some of the information included in said received first set of information. In some embodiments, processor 902 is further configured to: select a second portion of the received first set of information from the first set of information based on at least some of the information included in said received first set of information; and forward the second portion of the received first set of information to a neighboring access point.

In some embodiments, processor 902 is configured to transmit the first portion of the received first set of information during an expression broadcast interval. In various embodiments, said expression broadcast interval recurs in accordance with a predetermined schedule. In some embodiments, said expression advertisement interval occurs at a first rate and the expression broadcast interval recurs at a rate at least as fast as the first rate. In some embodiments, the expression advertisement interval recurs at an average rate which is faster than an average network registration update rate for a wireless communications device. In some such embodiments, the average rate associated with the expression advertisement interval is at least 10 times faster than the average network registration update rate. In some embodiments, a dedicated uplink communications resource corresponding to an individual wireless communications device is a set of OFDM tone-symbols.

Processor 902 is further configured to: receive a forwarded set of information from a neighboring access point; and transmit the forwarded set of information during a neighbor expression broadcast interval. In some embodiments, said forwarded information was received by said neighboring access point during an expression advertisement interval. Processor 902, in various embodiments, is configured to transmit information received from multiple neighboring access points during said neighbor expression broadcast interval.

Processor 902 is, in some embodiments, further configured to: receive information derived from expressions received by different access points from a server; and transmit the received information derived from expressions received by different access points to at least one communications device.

Figure 10:
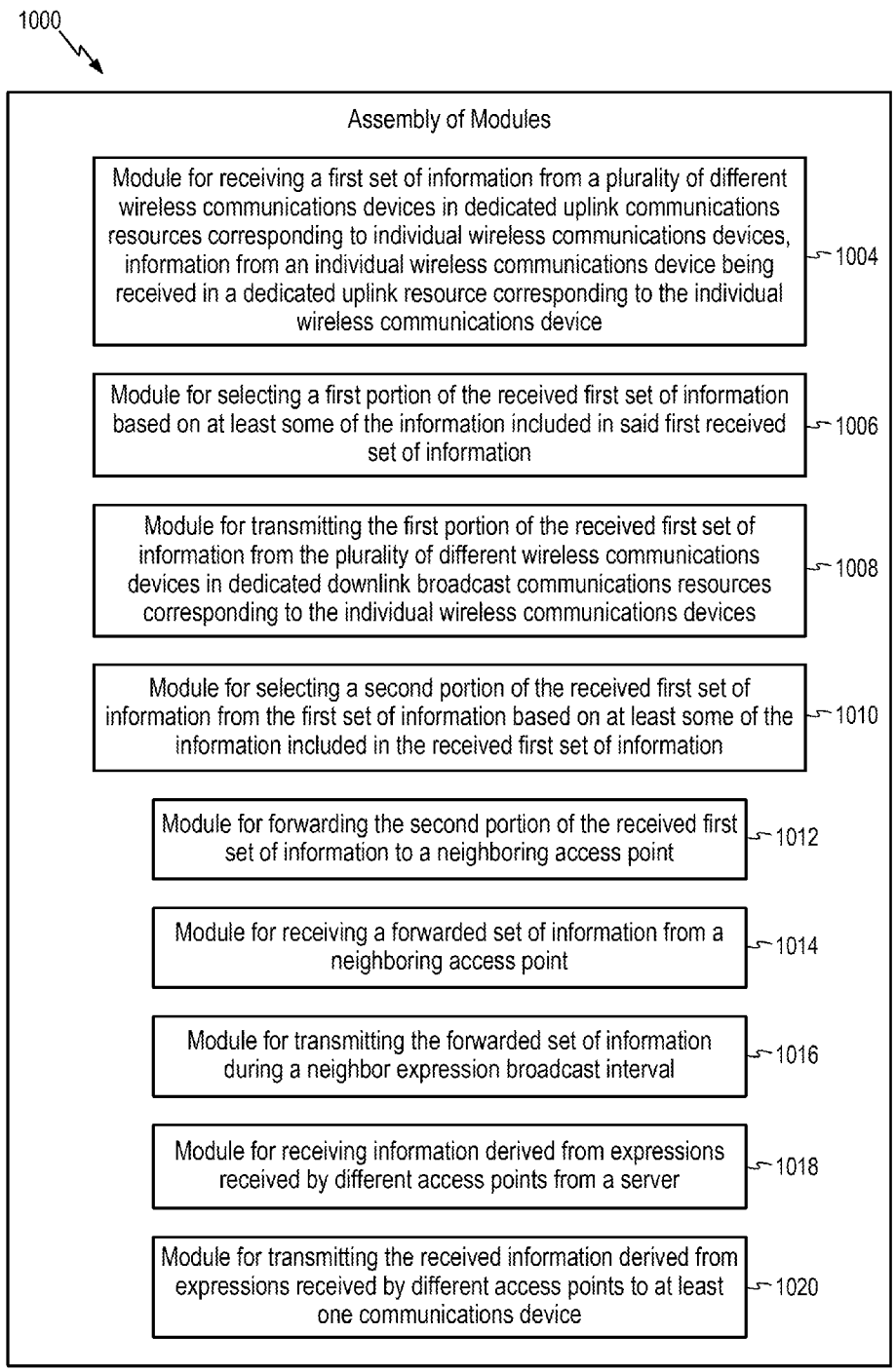
FIG. 10 is an assembly of modules which can, and in some embodiments is, used in the access point illustrated in FIG. 9.

FIG. 10 is an assembly of modules 1000 which can, and in some embodiments is, used in the access point 900 illustrated in FIG. 9. The modules in the assembly 1000 can be implemented in hardware within the processor 902 of FIG. 9, e.g., as individual circuits. Alternatively, the modules may be implemented in software and stored in the memory 904 of the access point 900 shown in FIG. 9. While shown in the FIG. 9 embodiment as a single processor, e.g., computer, it should be appreciated that the processor 902 may be implemented as one or more processors, e.g., computers. When implemented in software the modules include code, which when executed by the processor, configure the processor, e.g., computer, 902 to implement the function corresponding to the module. In some embodiments, processor 902 is configured to implement each of the modules of the assembly of module 1000. In embodiments where the assembly of modules 1000 is stored in the memory 904, the memory 904 is a computer program product comprising a computer readable medium comprising code, e.g., individual code for each module, for causing at least one computer, e.g., processor 902, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 10 control and/or configure the access point 900 or elements therein such as the processor 902, to perform the functions of the corresponding steps illustrated in the method flowchart 800 of FIG. 8.

Assembly of modules 1000 includes: a module 1004 for receiving a first set of information from a plurality of different wireless communications devices in dedicated uplink communications resources corresponding to individual wireless communications devices, information from an individual wireless communications device being received in a dedicated uplink resource corresponding to the individual wireless communications device, a module 1006 for selecting a first portion of the received first set of information based on at least some of the information included in said first set of information, a module 1008 for transmitting the first portion of the received first set of information from the plurality of different wireless communications devices in dedicated downlink broadcast communications resources corresponding to the individual wireless communications devices, and a module 1010 for selecting a second portion of the received first set of information from the first set of information based on at least some of the information included in the received first set of information. Assembly of modules 1010 further includes a module 1012 for forwarding the second portion of the received first set of information to a neighboring access point, a module 1014 for receiving a forwarded set of information from a neighboring access point, a module 1016 for transmitting the forwarded set of information during a neighbor expression broadcast interval, a module 1018 for receiving information derived from expressions received by different access points from a server, and a module 1020 for transmitting the received information derived from expressions received by different access points to at least one communications device.

In some embodiments, the first portion is the entire received first set of information. In various embodiments, the first set of information includes information transmitted by at least one wireless communications device operating in a sleep state with respect to the access point. In some such embodiments, the first set of information also includes information transmitted by at least one wireless communications device operating in an active state with respect to the access point.

In some embodiments, the first set of information is received during an expression advertisement interval. In some such embodiments, the expression advertisement interval recurs in accordance with a predetermined schedule. In various embodiments, transmitting the first portion of the received set of information is performed during an expression broadcast interval. In some such embodiments, the expression broadcast interval occurs in accordance with a predetermined schedule.

In some embodiments, the expression advertisement interval occurs at a first rate and the expression broadcast interval recurs at a rate at least as fast as the first rate. In various embodiments, the expression advertisement interval recurs at an average rate which is faster than an average network registration update for a wireless communications device. In some such embodiments, the average rate associated with the expression advertisement interval is at least 10 times faster than the average network registration update rate.

In some embodiments, a dedicated uplink communications resource corresponding to an individual wireless communications device is a set of OFDM tone-symbols. In some such embodiments, the set of OFDM tone-symbols corresponding to the individual wireless communications device changes over time in accordance with a predetermined hopping function.

In some embodiments, expression broadcast intervals and neighbor expression broadcast intervals can overlap in time. In some embodiments, forwarded information was received by the neighboring access point during an expression advertisement interval. In some embodiments, information received from multiple neighboring access points is transmitted during said neighbor expression broadcast interval.

Figure 11:
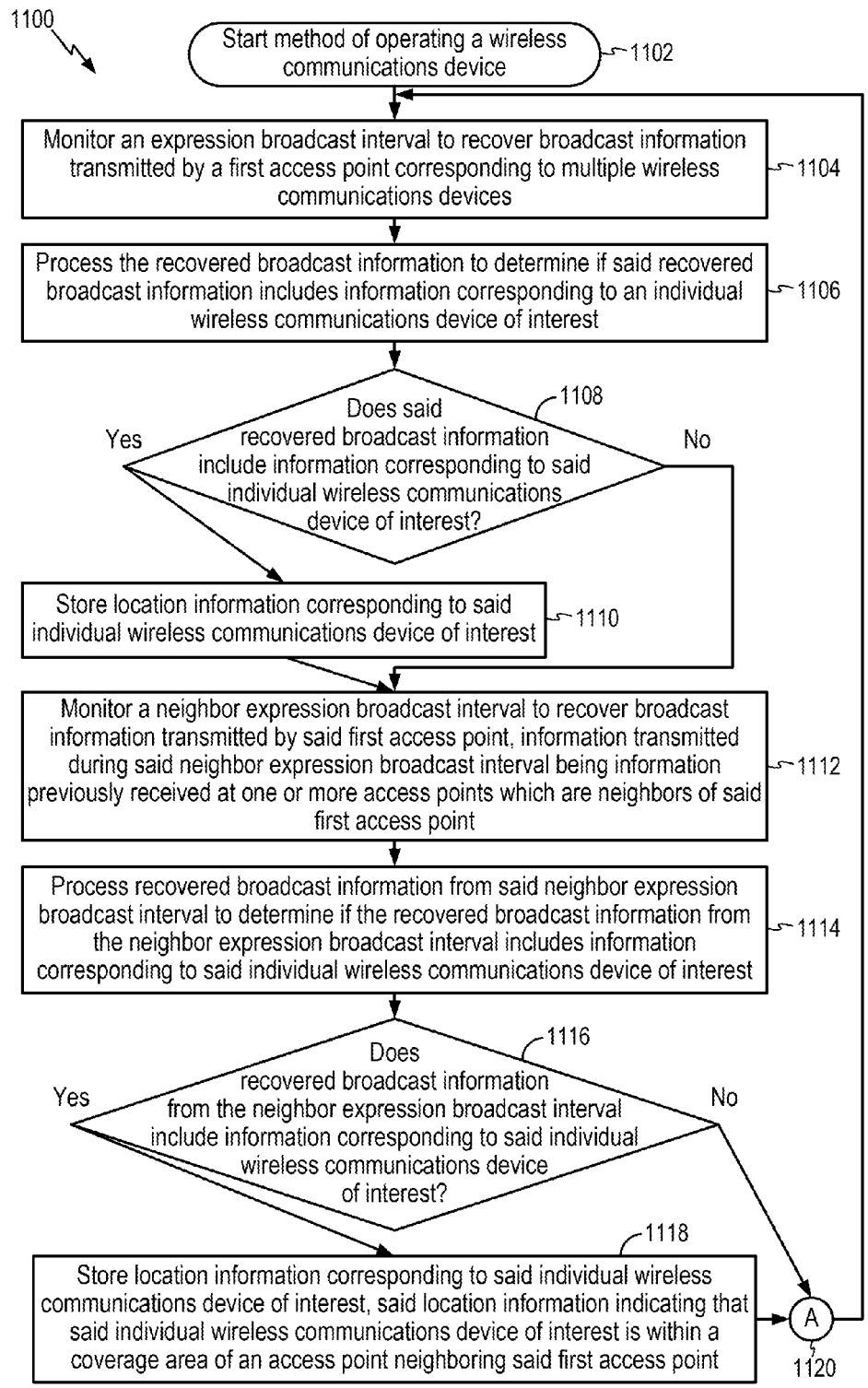
FIG. 11 is a flowchart of an exemplary method of operating a wireless communications device in accordance with an exemplary embodiment.

FIG. 11 is a flowchart 1100 of an exemplary method of operating a wireless communications device in accordance with an exemplary embodiment. The exemplary wireless communications device is, e.g., one of the wireless communications devices of system 100 of FIG. 1. Operation starts in step 1102, where the wireless communications device is powered on and initialized and proceeds to step 1104.

In step 1104 the wireless communications device monitors an expression broadcast interval to recover broadcast information transmitted by a first access point corresponding to multiple communications devices. In some embodiments, during at least some times during which the wireless communications device monitors the expression broadcast interval, the wireless communications device is operating in a sleep state with respect to the first access point. Operation proceeds from step 1104 to step 1106. In step 1106 the access point processes the recovered broadcast information to determine if said recovered broadcast information includes information corresponding to an individual wireless communications device of interest. Operation proceeds from step 1106 to step 1108.

In step 1108, if the wireless communications device has determined that the recovered broadcast information includes information corresponding to the individual wireless communications device of interest, then operation proceeds from step 1108 to step 1110; otherwise operation proceeds from step 1108 to step 1112.

Returning to step 1110, in step 1110 the wireless communications device stores location information corresponding to said individual wireless communications device of interest. Operation proceeds from step 1110 to step 1112.

In step 1112, the wireless communications device monitors a neighbor expression broadcast interval to recover broadcast information transmitted by said first access point, information transmitted during said neighbor expression broadcast interval being information previously received at one or more access points which are neighbors of said first access point. In some embodiments, during at least some times the wireless communications device monitors the neighbor expression broadcast interval while the wireless communications device is operating in a sleep state with respect to the first access point. In some embodiments, broadcast information recovered by monitoring a neighbor expression broadcast interval includes information which was communicated to one of the neighboring access points in an uplink expression advertisement interval. Operation proceeds from step 1112 to step 1114. In step 1114 the first wireless communications device processes recovered broadcast information from said neighbor expression broadcast interval to determine if the recovered broadcast information from the neighbor expression broadcast interval includes information corresponding to said individual wireless communications device of interest. Operation proceeds from step 1114 to step 1116.

In step 1116, if the wireless communications device has determined that recovered information from the neighbor expression broadcast interval includes information corresponding to the individual wireless communications device of interest, then operation proceeds from step 1116 to step 1118; otherwise, operation proceeds from step 1118 to connecting node A 1120.

Returning to step 1118, in step 1118 the wireless communications device stores location information corresponding to said individual wireless communications device of interest, said location information indicating that said individual wireless communications of interest is within a coverage area of an access point neighboring said first access point. Operation proceeds from step 1118 to connecting node A 1120.

Operation proceeds from connecting node A 1120 to the input of step 1104, as indicated by arrow 1122. Thus, arrow 1122 may be used to indicate that the wireless communications device returns to repeat steps including continuing to monitor the expression broadcast interval and continuing to monitor the neighbor expression broadcast interval. In some embodiments, the expression broadcast interval recurs according to a first schedule, the neighbor expression broadcast interval recurs according to a second schedule, the wireless communications device continues to monitor the expression broadcast interval according to the first schedule, and the wireless communications device continues to monitor the neighbor expression broadcast interval according to the second schedule.

In some embodiments, the wireless communications device may, and sometimes does, perform steps of flowchart 1100 for more than one individual wireless communications device of interest. For example the wireless communications device may be looking for broadcast information corresponding to multiple different individual wireless communications devices of interest, e.g., members of a group, in expression broadcast intervals and neighbor expression broadcast intervals. The group is, e.g., a peer social networking group or gaming group or other type of group of which the wireless communications device implementing the method is a member or has an interest. The multiple individual wireless communications devices of interest, in some embodiments, have a common association or characteristic, e.g., the devices are capable of providing a certain type of information of interest to the device implementing the method of flowchart 1100.

Figure 12:
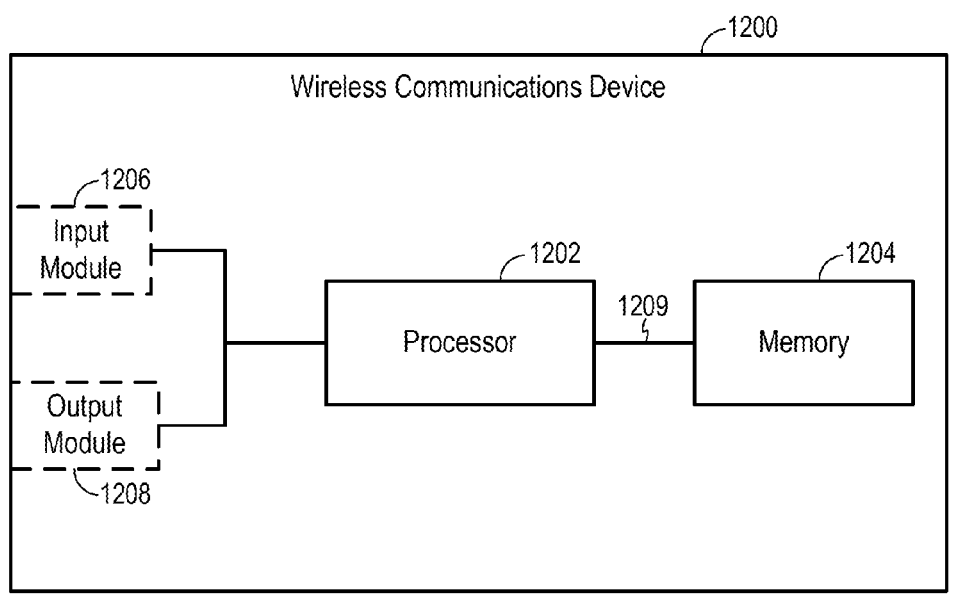
FIG. 12 is a drawing of an exemplary wireless communications device, in accordance with an exemplary embodiment.

FIG. 12 is a drawing of an exemplary wireless communications device 1200, in accordance with an exemplary embodiment. Exemplary wireless communications device 1200 is, e.g., one of the wireless communications devices of FIG. 1. Exemplary wireless communications device 1200 may, and sometimes does, implement a method in accordance with flowchart 1100 of FIG. 11.

Wireless communications device 1200 includes a processor 1202 and memory 1204 coupled together via a bus 1209 over which the various elements (1202, 1204) may interchange data and information. Wireless communications device 1200 further includes an input module 1206 and an output module 1208 which may be coupled to processor 1202 as shown. However, in some embodiments, the input module 1206 and output module 1208 are located internal to the processor 1202. Input module 1206 can receive input signals. Input module 1206 can, and in some embodiments does, include a wireless receiver and/or a wired or optical input interface for receiving input. Output module 1208 may include, and in some embodiments does include, a wireless transmitter and/or a wired or optical output interface for transmitting output.

Processor 1202 is configured to: monitor an expression broadcast interval to recover broadcast information transmitted by a first access point corresponding to multiple wireless communications devices; and process the recovered broadcast information to determine if said recovered broadcast information includes information corresponding to an individual wireless communications device of interest. In various embodiments, during at least some times while wireless communications device 1200 is monitoring an expression broadcast interval said wireless communications device 1200 is operating in a sleep state with respect to the first access point. Processor 1202 is further configured to: store location information corresponding to said individual wireless communications device of interest in response to a determination that said recovered broadcast information includes information corresponding to said individual wireless communications device of interest.

In various embodiments, processor 1202 is further configured to: monitor a neighbor expression broadcast interval to recover broadcast information transmitted by said first access point, information transmitted during said neighbor expression broadcast interval being information previously received at one or more neighboring access points which are neighbors of said first access point; and process recovered broadcast information from said neighbor expression broadcast interval to determine if the recovered broadcast information from said neighbor broadcast interval includes information corresponding to said individual wireless communications device is of interest. In some such embodiments, processor 1202 is further configured to store location information corresponding to said individual wireless communications device of interest in response to a determination that said recovered broadcast information from said neighbor expression broadcast interval includes information corresponding to said individual wireless communications device of interest, said location information indicating that said individual wireless communications device of interest is within a coverage area of an access point neighboring said first access point. In some embodiments, broadcast information recovered by monitoring a neighbor expression broadcast interval includes information which was communicated to one of the neighboring access points in an uplink expression advertisement interval.

In some embodiments, the expression broadcast interval recurs according to a first schedule and the neighbor expression broadcast interval recurs according to a second schedule, and processor 1202 is further configured to: continue to monitor said expression broadcast interval according to the first schedule; and continue to monitor said neighbor expression broadcast interval according to the second schedule.

Figure 13:
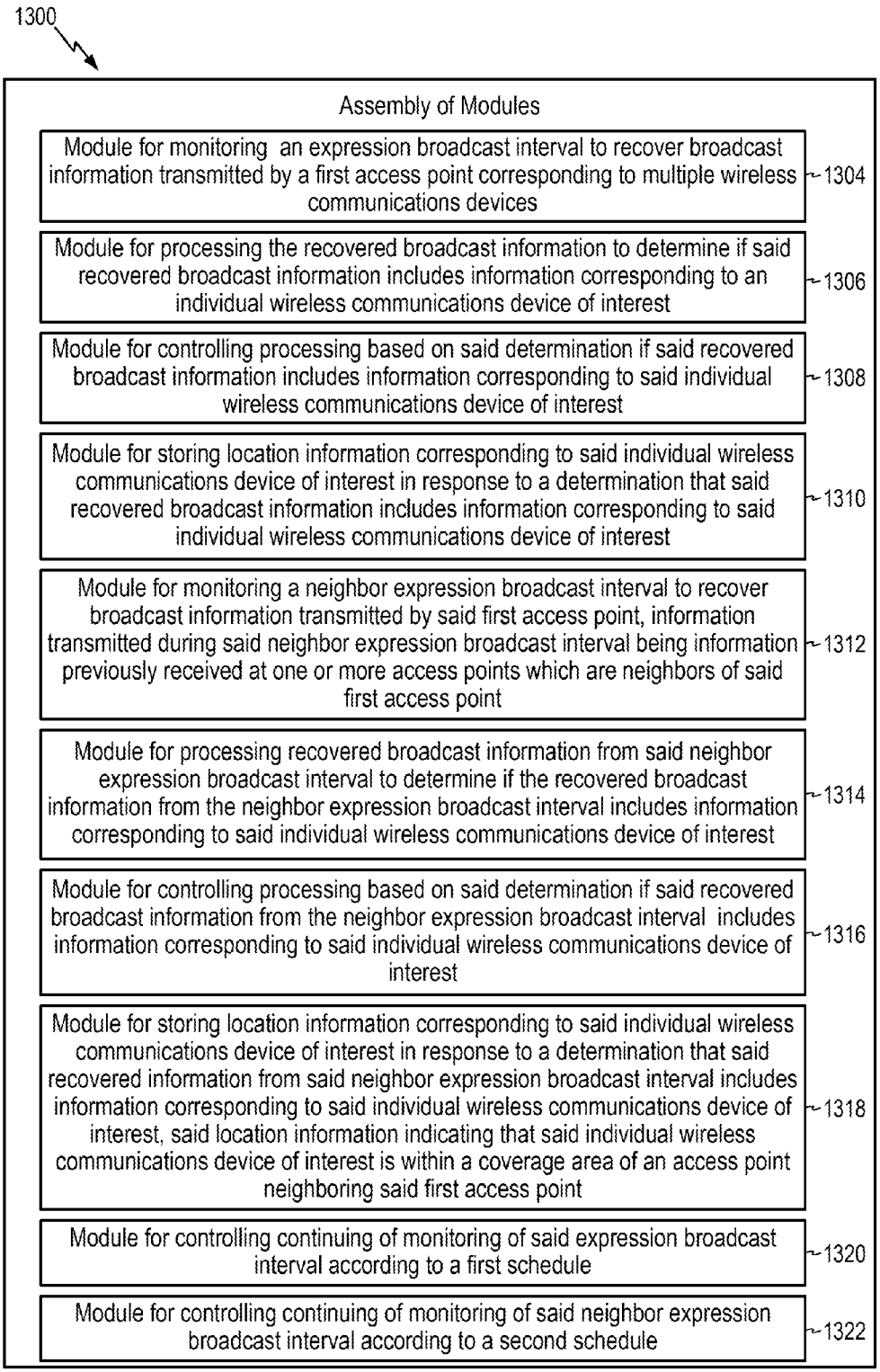
FIG. 13 is an assembly of modules which can, and in some embodiments is, used in the wireless communications device illustrated in FIG. 12.

FIG. 13 is an assembly of modules 1300 which can, and in some embodiments is, used in the wireless communications device 1200 illustrated in FIG. 12. The modules in the assembly 1300 can be implemented in hardware within the processor 1202 of FIG. 12, e.g., as individual circuits. Alternatively, the modules may be implemented in software and stored in the memory 1304 of the wireless communications device 1200 shown in FIG. 12. While shown in the FIG. 12 embodiment as a single processor, e.g., computer, it should be appreciated that the processor 1202 may be implemented as one or more processors, e.g., computers. When implemented in software the modules include code, which when executed by the processor, configure the processor, e.g., computer, 1202 to implement the function corresponding to the module. In some embodiments, processor 1202 is configured to implement each of the modules of the assembly of module 1300. In embodiments where the assembly of modules 1300 is stored in the memory 1204, the memory 1204 is a computer program product comprising a computer readable medium comprising code, e.g., individual code for each module, for causing at least one computer, e.g., processor 1202, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 13 control and/or configure the wireless communications device 1200 or elements therein such as the processor 1202, to perform the functions of the corresponding steps illustrated in the method flowchart 1100 of FIG. 11.

As illustrated in FIG. 13, the assembly of modules 1300 includes: a module 1304 for monitoring an expression broadcast interval to recover broadcast information transmitted by a first access point corresponding to multiple wireless communications devices, a module 1306 for processing the recovered broadcast information to determine if said recovered broadcast information includes information corresponding to an individual wireless communications device of interest, a module 1308 for controlling processing based on said determination if said recovered broadcast information includes information corresponding to said individual wireless communications device of interest, and a module 1310 for storing location information corresponding to said individual wireless communications device of interest in response to a determination that said recovered broadcast information includes information corresponding to said individual wireless communications device of interest. Assembly of modules 1300 further includes: a module 1312 for monitoring a neighbor expression broadcast interval to recover broadcast information transmitted by said first access point, information transmitted during said neighbor expression broadcast interval being information previously received at one or more access points which are neighbors of first access point, and a module 1314 for processing recovered broadcast information from said neighbor expression broadcast interval to determine if the recovered broadcast information from the neighbor expression broadcast interval includes information corresponding to said individual wireless communications device of interest.

Assembly of modules 1300 further comprises a module 1316 for controlling processing based on said determination if said received broadcast information from the neighbor expression broadcast interval includes information corresponding to said individual wireless communications device of interest, and module 1318 for storing location information corresponding to said individual wireless communications device of interest in response to a determination that said recovered information from said neighbor expression broadcast interval includes information corresponding to said individual wireless communications device of interest, said location information indicating that said individual wireless communications device of interest is within a coverage area of an access point neighboring said first access point. Assembly of modules 1300 further includes a module 1320 for controlling continuing monitoring of said expression broadcast interval according to a first schedule and a module 1322 for controlling continuing of monitoring of said neighbor expression broadcast interval according to a second schedule.

Figure 14:
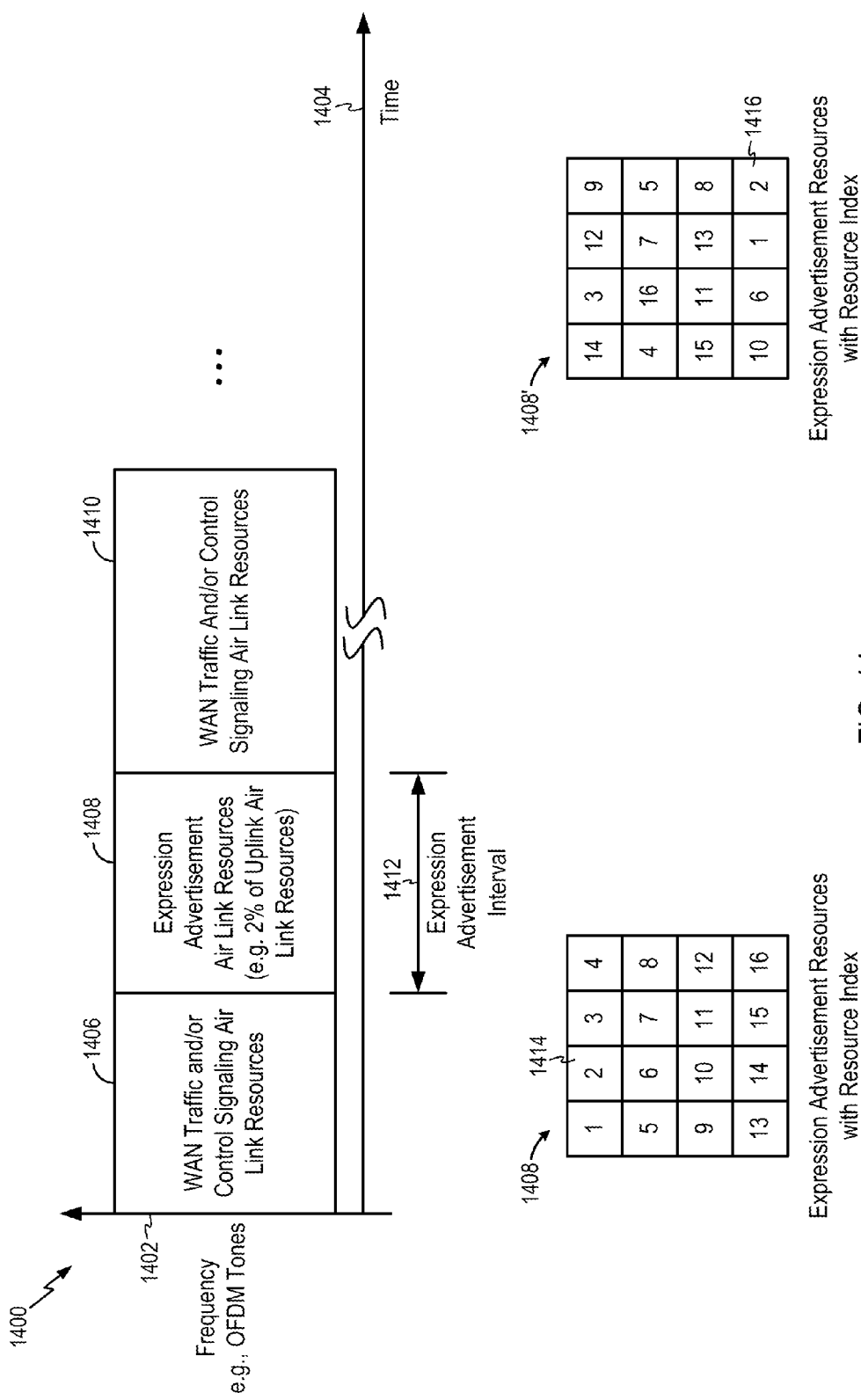
FIG. 14 includes a drawing of an exemplary wide area network uplink timing frequency structure in accordance with an exemplary embodiment.

FIG. 14 includes a drawing 1400 of an exemplary wide area network (WAN) uplink timing frequency structure in accordance with an exemplary embodiment. Vertical axis 1402 represents frequency, e.g., OFDM tones, while horizontal axis 1404 represents time. In some embodiments, units of time are OFDM symbol transmission time intervals. The WAN uplink timing frequency structure includes WAN traffic and/or controlling signaling air link resources 1406, expression advertisement air link resources 1408, and WAN traffic and/or control signaling air link resources 1410. The timing frequency structure in this embodiment follows a recurring pattern. In this example, the expression advertisement air link resources 1408 occur during expression advertisement interval 1412. In this example, the expression advertisement air link resources are a very small portion of the set of resources including resources 1406, 1408 and 1410, e.g., approximately 2% of the set.

Expression advertisement air link resources 1408, in this example, includes a set of 16 different resources each associated with a different expression advertisement resource index (1, 2, . . . , 16). In other embodiments there are a different number of resources in the set, typically a larger number of resources in the set. The number of resources in the set of expression advertisement resources for an access point, in some embodiments, has been chosen to accommodate the expected number of users which may at any one time be registered at the access point including users in sleep state and users in active state. At a given time the number of users allowed to be in active state is typically much smaller than the number of users that may be in sleep state at the access point. And the number of users at a given time in sleep state at the access point is typically much smaller than the number of users in sleep state within a paging region including the access point and within the totality of the system. In one exemplary embodiment, the structure is such to support 200 active users at an access point, 4000 sleep users at the access point, 5600 expression advertisement resource IDs at the access point, 20000 paging IDs in a paging region including the access point and one or more other access points, and 10000000 wireless communications devices in the communications system. In some embodiments, an individual expression advertisement air link resource comprises one OFDM tone for a predetermined fixed number of OFDM symbol transmission time intervals.

In some embodiments, signals transmitted by wireless terminals using expression advertisement air link resources 1408 are signals which have open loop power control. At least some signal transmitted by wireless terminals in one of more of WAN traffic and/or control air link resources (1406, 1410) are closed loop power control signals and/or closed loop timing control signals. As a result some uplink traffic signals communicated in one or more of resources (1406, 1410) are signals which have been close loop power controlled and/or closed loop timing controlled.

In this embodiment, the location of an individual resource associated with a particular expression advertisement resource index may, and sometimes does, vary from one expression advertisement interval to the next in accordance with a hopping information. Block 1408 shows a first mapping of air link resources during a first expression advertisement interval 1412, while block 1408' shows a second mapping of air link resources during a subsequent expression advertisement interval in accordance with an exemplary hopping function. A particular wireless terminal may acquire and hold an individual expression advertisement resource index while registered at an access point, e.g. base station, and use the resources associated with the index. For example, a first wireless terminal may acquire expression advertisement resource index 2 and may use individual resource 1414 of expression advertisement resource block 1408 and individual resource 1416 of expression advertisement resource block 1408'.

Figure 15:
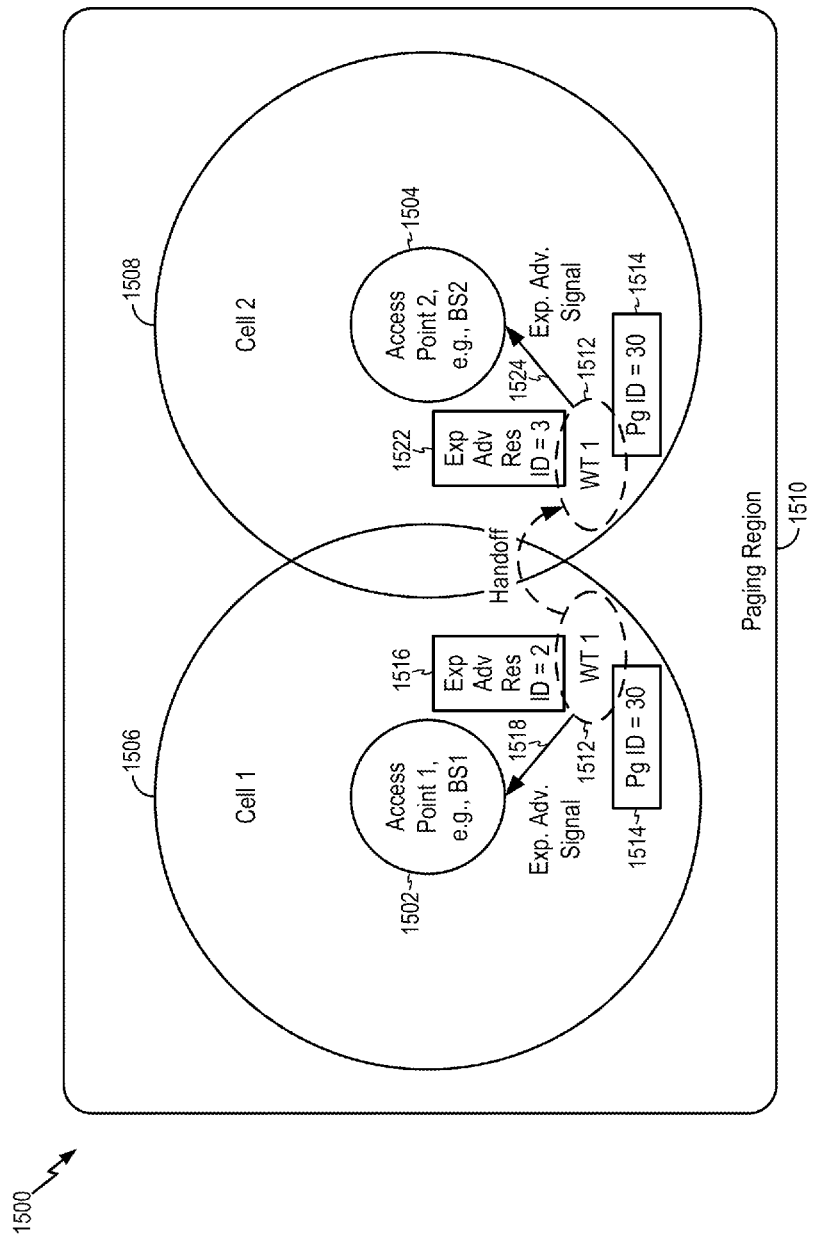
FIG. 15 is a drawing used to illustrate an exemplary embodiment in which a wireless terminal has a paging identifier associated with paging air link resources and a expression advertisement resource identifier associated with expression advertisement air link resources, wherein the expression advertisement resource identifier is local with respect to a particular access point and the paging identifier applies to a paging region including a plurality of access point.

FIG. 15 is a drawing 1500 used to illustrate an exemplary embodiment in which a wireless terminal has a paging identifier associated with paging air link resources and an expression advertisement resource identifier associated with expression advertisement air link resources, wherein the expression advertisement resource identifier is local with respect to an access point and the paging identifier applies to a paging region including a plurality of access point. Drawing 1500 includes access point 1 1502, e.g., base station 1, and access point 2 1504, e.g., base station 2. Access point 1 1502 has a wireless coverage area represented by cell 1 1506, while access point 2 1504 has a wireless coverage area 1508 represented by cell 2 1508. Both cell 1 1506 and cell 2 1508 are within paging region 1510.

Wireless terminal 1 1512 has paging identifier=30 1514, which it keeps and uses while it is in paging region 1510. Consider that wireless terminal 1 1512 is registered with access point 1 1502, and consider that wireless terminal 1 1512 has local expression advertisement resource identifier=2 for access point 1 1502 as indicated by block 1516. Wireless terminal 1 1512 uses the expression advertisement air link resource associated with expression advertisement air link resource index=2 for access point 1 1502 to transmit uplink expression advertisement signal 1518 to access point 1 1502. WT 1 1512 may be in sleep state or active state with respect to access point 1 1502 when it transmits signal 1518.

Now consider that wireless terminal 1 1512 moves from cell 1 1506 to cell 2 1508 as indicated by dashed arrow 1520. As part of the move, a handoff occurs and wireless terminal 1 1512 acquires a new local expression advertisement resource identifier which corresponds to access point 2 1504. In this example, wireless terminal 1 1512 acquires expression advertisement resource identifier=3 for access point 2 1504 as indicated by block 1522. Wireless terminal 1 1512 uses the expression advertisement air link resource associated with expression advertisement air link resource index=3 for access point 2 1504 to transmit uplink expression advertisement signal 1524 to access point 2 1504. WT 1 1512 may be in sleep state or active state with respect to access point 2 1504 when it transmits signal 1524.

Figure 16:
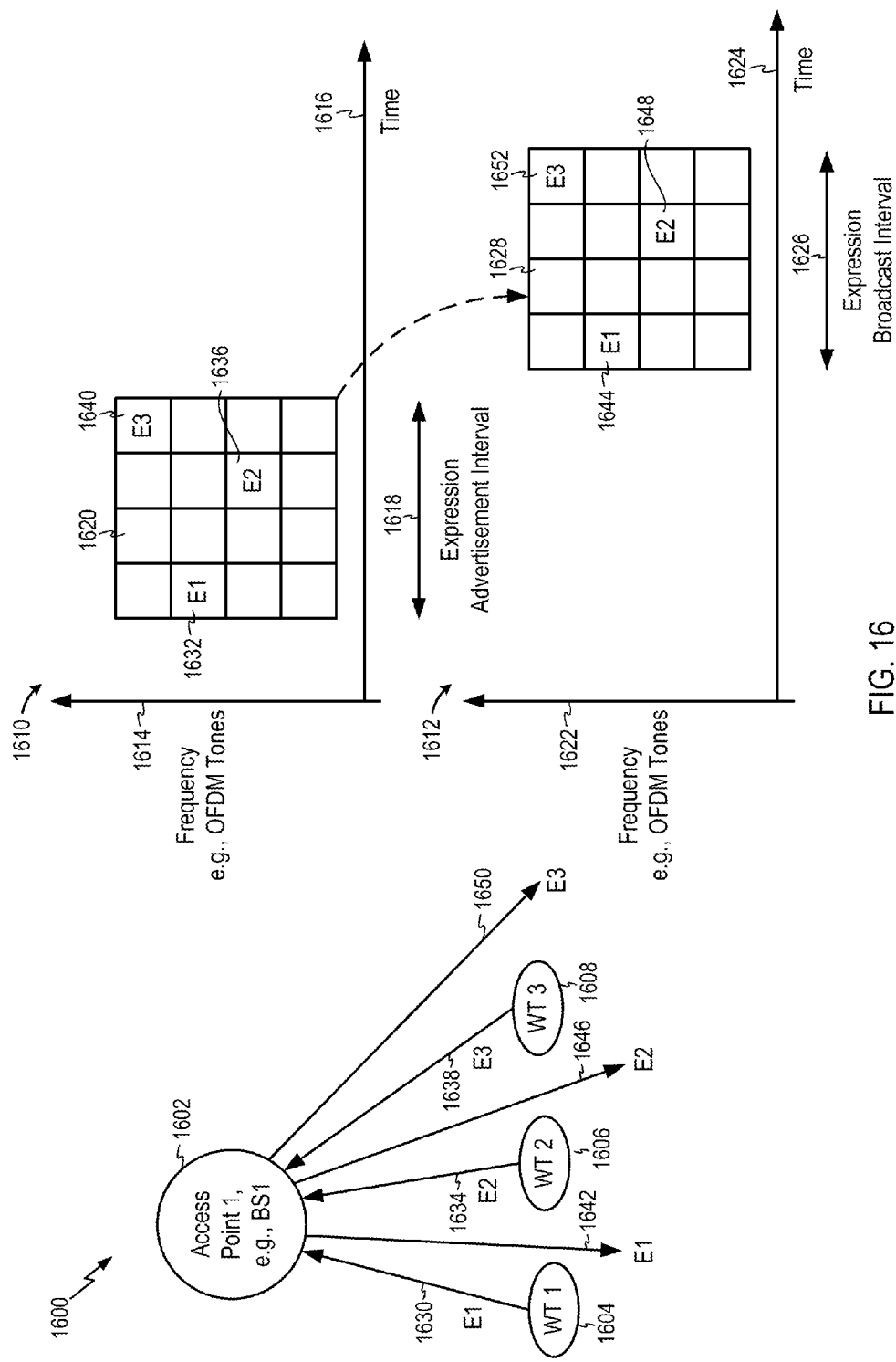
FIG. 16 is a drawing illustrating an access point, a plurality of wireless terminals using the access point, an uplink expression advertisement interval and a corresponding downlink expression broadcast interval, in accordance with an exemplary embodiment.

FIG. 16 is a drawing illustrating an uplink expression advertisement interval and a corresponding downlink expression broadcast interval in accordance with an exemplary embodiment. Drawing 1600 of FIG. 16 includes exemplary access point 1 1602, e.g., base station 1, and a plurality of wireless terminals (wireless terminal 1 1604, wireless terminal 2 1606, wireless terminal 3 1608). Drawing 1610 illustrates a portion of an exemplary uplink timing frequency structure being used by access point 1 1602 and wireless terminals (1604, 1606, 1608). Drawing 1612 illustrates a portion of an exemplary downlink timing frequency structure being used by access point 1 1602 and wireless terminals (1604, 1606, 1608).

The uplink timing frequency structure of drawing 1610 includes a vertical axis 1614 representing frequency, e.g., OFDM tones, and a horizontal axis 1616 representing time. The uplink timing includes an expression advertisement interval 1618 during which there is a set of expression advertisement air link resources 1620.

The downlink timing frequency structure of drawing 1612 includes a vertical axis 1622 representing frequency, e.g., OFDM tones, and a horizontal axis 1624 representing time. The downlink timing includes an expression broadcast interval 1626 during which there is a set of expression broadcast air link resources 1628.

Each of the wireless terminals (WT 1 1604, WT 2 1606, WT 3 1608) has a different expression advertisement resource index. WT 1's expression advertisement resource index maps to individual dedicated expression advertisement air link resource 1632 of set of resources 1620. WT 2's expression advertisement resource index maps to individual dedicated expression advertisement air link resource 1636 of set of resources 1620. WT 3's expression advertisement resource index maps to individual dedicated expression advertisement air link resource 1640 of set of resources 1620.

During expression advertisement interval 1618, (WT 1 1604, WT 2 1606, WT 3 1608) transmit expression advertisements signals (1630, 1634, 1638), respectively, using resources (1632, 1636, 1640), respectively, which convey expressions (E1, E2, E3), respectively, to access point 1 1602.

In this example, expression broadcast interval 1626 corresponds to expression advertisement interval 1618, and set of expression broadcast air link resources 1628 corresponds to set of expression advertisement air link resources 1620. In this particular embodiment, the broadcast of the expression broadcast interval is an echo back of information received during the expression advertisement interval. Access point 1 1602 broadcasts, signals (1642, 1646, 1650) using resources (1644, 1648, 1652), respectively, which convey expressions (E1, E2, E3), respectively. In this example, the location of a particular resource in the set of expression advertisement air link resources 1620 and a corresponding resource in the set of expression broadcast air link resources 1628 have the same relative position. In other embodiments, relative positions of corresponding resources may be different from an expression advertisement interval to an expression broadcast interval, with the mapping being known to the access point and wireless terminals.

The broadcast signals from the expression broadcast interval signals may be received and processed by the wireless terminals (WT 1 1604, WT 2 1606, WT 3 1608). A pair of individual wireless terminals may be situated, e.g., due to terrain, obstructions, etc., such that they may be unable to successfully receive and recover directly each other's uplink expression advertisement interval signaling. However, it is more likely that a wireless terminal will be able to successfully communicate with access point 1 1602, e.g., due to access point 1's antenna location and/or access point 1's receiver/transmitter capabilities which are typically better than those of a wireless terminal. Thus information sent up in expression advertisement interval 1618 by a wireless terminal is more likely to be successfully recovered by other wireless terminals via the downlink expression broadcast interval signaling communicated by the access point. In addition, it may be observed that there are multiple individual expression advertisement air link resources which occur concurrently during expression advertisement interval 1618. When a wireless terminal is transmitting its own uplink expression advertisement signal it is unable to recover expression advertisement signals from other wireless terminals which may be transmitting concurrently. The use of the expression broadcast interval 1626 facilities recovery of expressions from other wireless terminals which may been be scheduled to use time concurrent resources in the expression advertisement interval.

The example of FIG. 16 illustrates an access point, e.g., base station, which echos back information received in expression advertisement air link resources in corresponding expression broadcast interval air link resources. Such as access point may be viewed as a dumb access point. In some other embodiments, the access point interprets bits of information received in the expression advertisement interval and selectively relays information in the expression broadcast interval 1626. Such an access point may be viewed as an intelligent access point. In some embodiments in which the access point makes selection decisions regarding rebroadcast of received information in the expression broadcast interval, the size of the expression advertisement interval air link resources and the size of the expression broadcast interval air link resource may be, and sometimes are, different.

Figure 17:
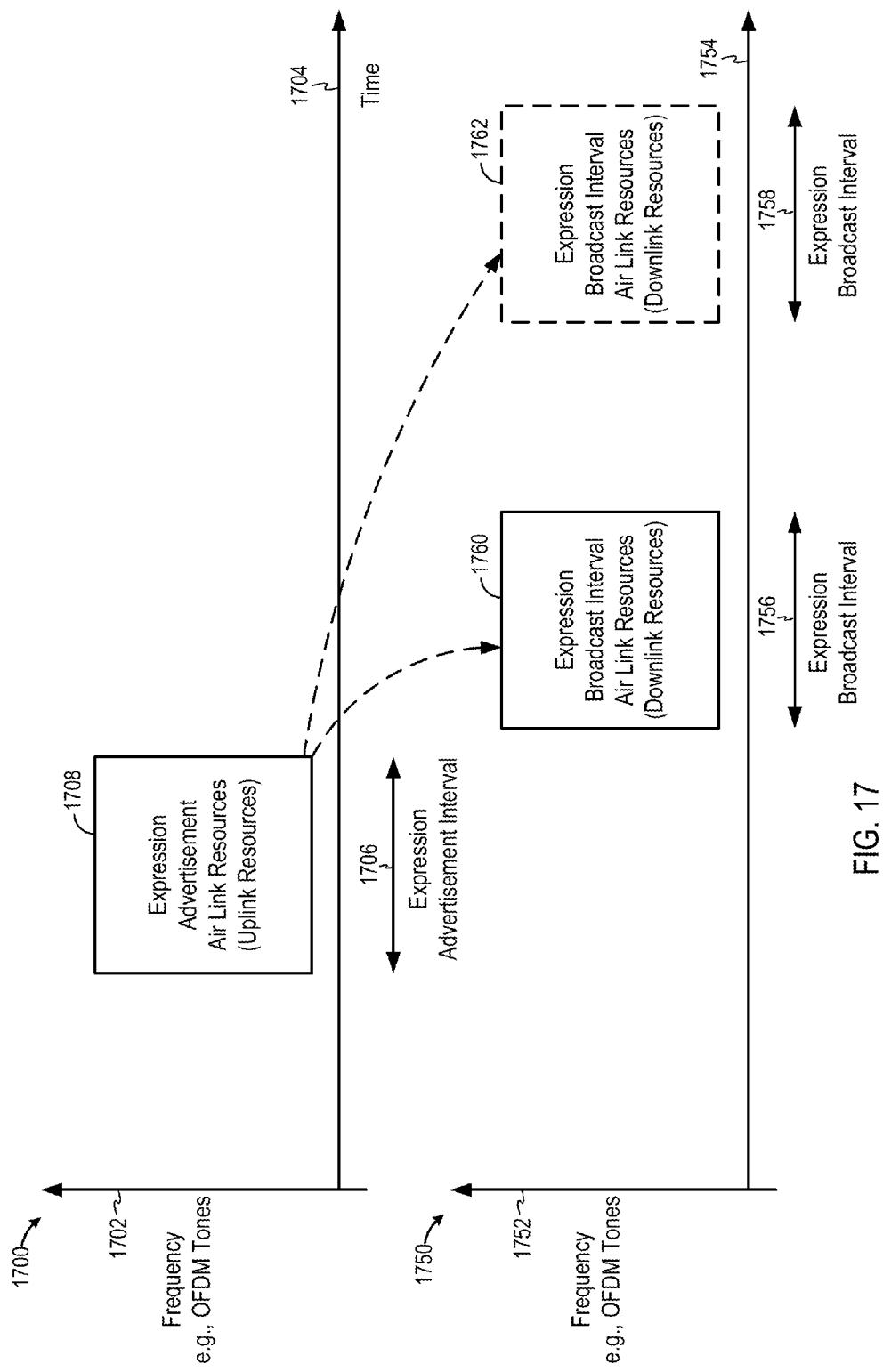
FIG. 17 illustrates an exemplary expression advertisement air link resources block and one or more corresponding expression broadcast interval air link resources blocks in accordance with an exemplary embodiment.

FIG. 17 illustrates an exemplary expression advertisement air link resources block 1708 and one or more corresponding expression broadcast interval air link resources blocks (1760, 1762). Drawing 1700 of FIG. 17 illustrates an exemplary frequency vs time plot for an uplink. Drawing 1700 includes a vertical axis 1702 representing frequency, e.g., OFDM tones, and a horizontal axis 1704 representing time. The plot 1700 includes an expression advertisement air link resources block 1708 which occurs during expression advertisement interval 1706 in the uplink timing structure. Drawing 1750 of FIG. 17 illustrates an exemplary frequency vs time plot for a downlink. Drawing 1750 includes a vertical axis 1752 representing frequency, e.g., OFDM tones, and a horizontal axis 1754 representing time. The plot 1750 includes a first expression broadcast interval air link resources block 1760 which occurs during expression broadcast interval 1756 in the downlink timing structure and an optional second expression broadcast interval air link resources block 1762 which occurs during expression broadcast interval 1758 in the downlink timing structure.

In some embodiments, information transmitted in expression broadcast interval air link resources 1760 and 1762 by an access point is a copy of information received by the access point in expression advertisement interval air link resources 1708. In some other embodiments, information transmitted in expression broadcast interval air link resources 1760 and 1762 by an access point is a processed version of information received by the access point in expression advertisement interval air link resources 1708, e.g., a selected subset of information received.

In various embodiments, the same information is transmitted by the access point in expression broadcast interval air link resources 1760 and expression broadcast interval air link resources 1762. In some embodiments, there are additional expression broadcast interval air link resource blocks in addition to blocks 1760 and 1762 corresponding to expression advertisement air link resources block 1708.

The example of FIG. 17 illustrates that, in some embodiments, with regard to expression information the rebroadcast rate in the downlink is higher than the uplink rate. The access point, typically a fixed location node using line power, may not be as power constrained as a wireless terminal, e.g., mobile node, using battery power. An additional advantage of multiple rebroadcasts of received expression information is that discovery operations by wireless communications devices tend to be speeded up, e.g., peer to peer discovery operations tend to occur more quickly.

Figure 18:
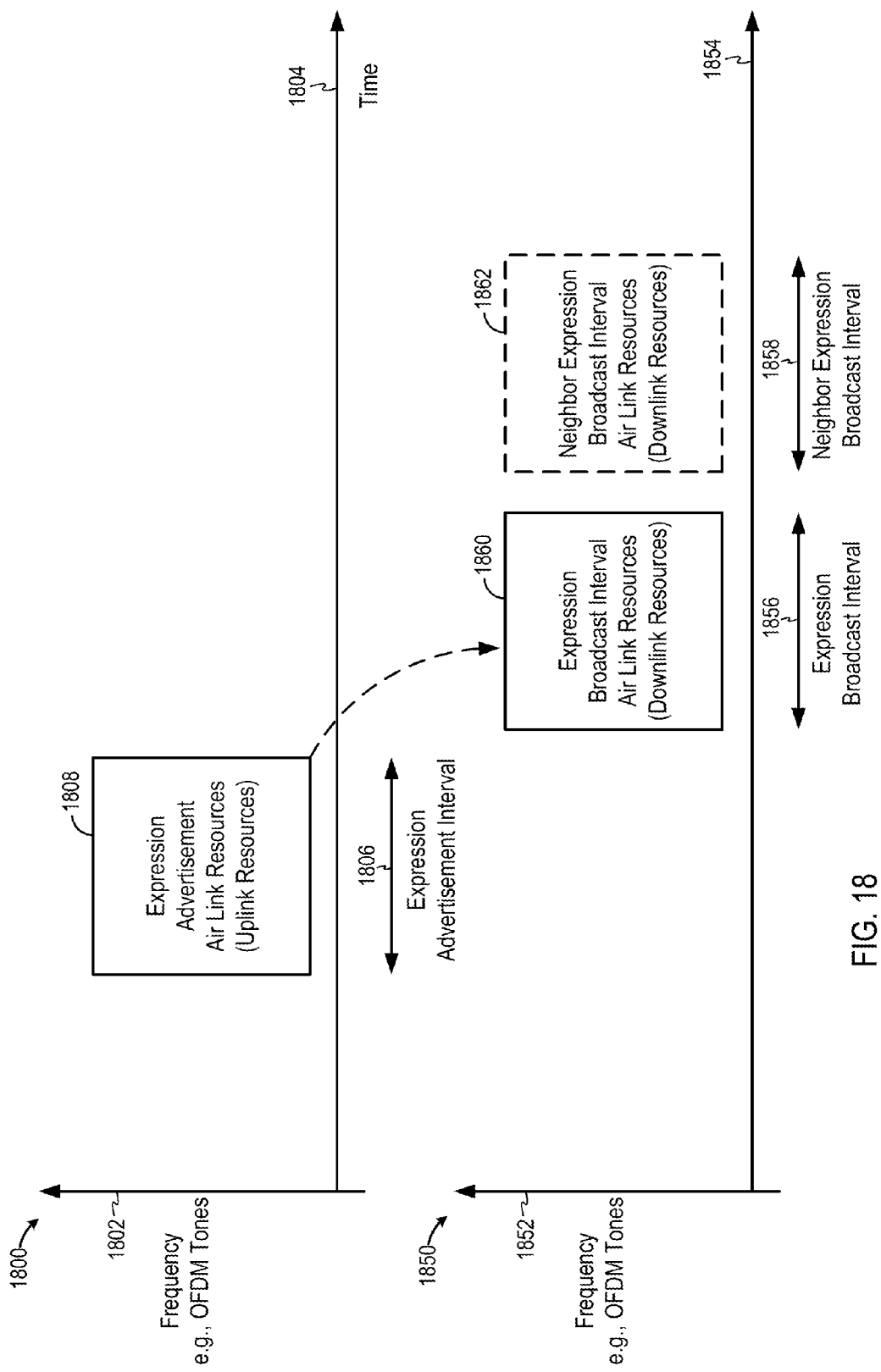
FIG. 18 illustrates an exemplary expression advertisement air link resources block, a corresponding expression broadcast interval air link resources block and a neighbor expression broadcast interval air link resources block, in accordance with an exemplary embodiment.

FIG. 18 illustrates an exemplary expression advertisement air link resources block 1808, a corresponding expression broadcast interval air link resources block 1860 and a neighbor expression broadcast interval air link resources block 1862. Drawing 1800 of FIG. 18 illustrates an exemplary frequency vs time plot for an uplink of an access point. Drawing 1800 includes a vertical axis 1802 representing frequency, e.g., OFDM tones, and a horizontal axis 1804 representing time. The plot 1800 includes an expression advertisement air link resources block 1808 which occurs during expression advertisement interval 1806 in the uplink timing structure. Drawing 1850 of FIG. 18 illustrates an exemplary frequency vs time plot for a downlink of the access point. Drawing 1850 includes a vertical axis 1852 representing frequency, e.g., OFDM tones, and a horizontal axis 1854 representing time. The plot 1850 includes expression broadcast interval air link resources block 1860 which occurs during expression broadcast interval 1856 in the downlink timing structure and a neighbor expression broadcast interval air link resources block 1862 which occurs during a neighbor expression broadcast interval 1858 in the downlink timing structure.

Expression broadcast interval air link resources block 1860 carries information received in expression advertisement air link resources block 1808 by the access point or processed information based on information received in expression advertisement air link resources block 1808 by the access point. Neighbor expression broadcast interval air link resources block 1862 carries information that has been received by a neighboring access point in an expression advertisement air link resources block of the neighboring access points uplink timing structure or processed information based on information that has been received by the neighboring access point in an expression advertisement air link resources block of the neighboring access points uplink timing structure.

In the example of FIG. 18, a wireless terminal using an access point is able to recover expression advertisement information corresponding to wireless terminals using the same access point via expression broadcast interval air link resources 1860. In addition, a wireless terminal using the access point is able to recover expression advertisement information corresponding to wireless terminals using at least one neighboring access point via neighbor expression broadcast interval air link resources 1862.

Figure 19:
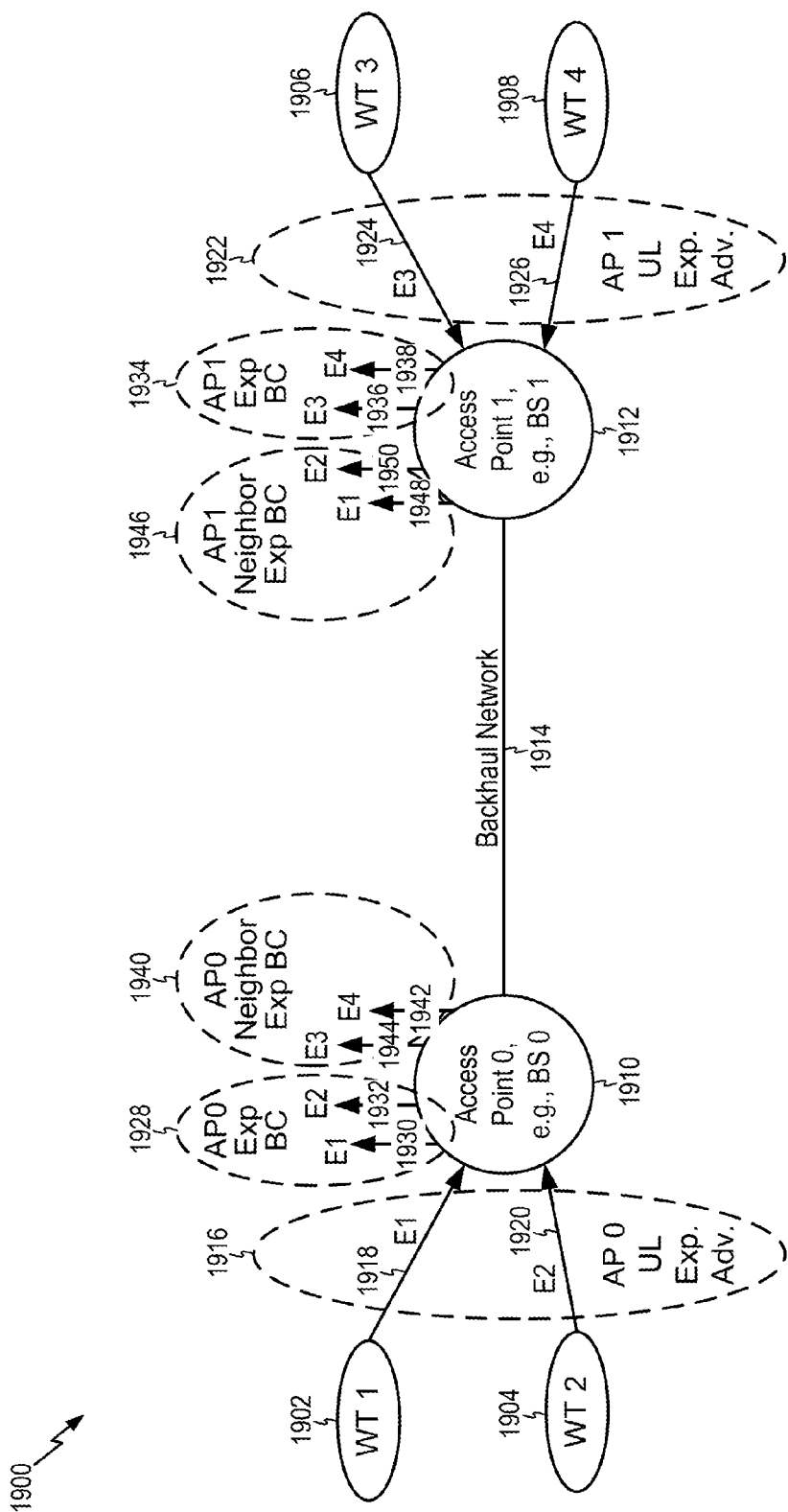
FIG. 19 is a drawing illustrating a signaling example in an exemplary communications system including a plurality of wireless terminals and a plurality of access points which use expression advertisement intervals, expression broadcast intervals, and neighbor expression broadcast intervals.

FIG. 19 is a drawing illustrating an exemplary communications system 1900 including a plurality of wireless terminals (WT 1 1902, WT 2 1904, WT 3 1906, WT 4 1908), e.g., mobile nodes, and a plurality of access points (AP 0 1910, AP 1 1912), e.g., base stations. The access points (1910, 1912) are coupled together via a backhaul network 1914.

In this example, WT 1 1902 and WT 2 1904 are currently registered with access point 0 1910 and each have an expression advertisement resource index identifier associated with dedicated uplink resources in the expression advertisement resources for access point 0. Wireless terminal 1 1902 may be currently in a sleep state or active state with respect to access point 0 1910. Wireless terminal 2 1904 may be currently in a sleep state or active state with respect to access point 0 1910.

In this example, WT 3 1906 and WT 4 1908 are currently registered with access point 1 1912 and each have an expression advertisement resource index identifier associated with dedicated uplink resources in the expression advertisement resources for access point 1. Wireless terminal 3 1906 may be currently in a sleep state or active state with respect to access point 1 1912. Wireless terminal 4 1908 may be currently in a sleep state or active state with respect to access point 1 1912.

Corresponding to the uplink at access point 0, there is an access point 0 expression advertisement interval and access point 0 expression advertisement air link resources as indicated by dashed line ellipse 1916. Wireless terminal 1 1902 transmits uplink expression advertisement signal 1918 conveying expression E1 using its allocated dedicated uplink expression advertisement air link resource to access point 0 1910. Wireless terminal 2 1904 transmits uplink expression advertisement signal 1920 conveying expression E2 using its allocated dedicated uplink expression advertisement air link resource to access point 0 1910. Access point 0 1910 forwards received expression advertisement information E1 and E2 via backhaul network 1914 to access point 1 1912.

Corresponding to the uplink at access point 1 1912, there is an access point 1 expression advertisement interval and access point 1 expression advertisement air link resources as indicated by dashed line ellipse 1922. Wireless terminal 3 1906 transmits uplink expression advertisement signal 1924 conveying expression E3 using its allocated dedicated uplink expression advertisement air link resource to access point 1 1912. Wireless terminal 4 1908 transmits uplink expression advertisement signal 1926 conveying expression E4 using its allocated dedicated uplink expression advertisement air link resource to access point 1 1912. Access point 1 1912 forwards received expression advertisement information E3 and E4 via backhaul network 1914 to access point 0 1910.

Corresponding to the downlink at access point 0 1910 there is an access point 0 expression broadcast interval and access point 0 expression broadcast air link resources as indicated by dashed line ellipse 1928. Access point 0 transmits signal 1930 conveying expression E1 and signal 1932 conveying expression E2 during the access point 0 expression broadcast interval using access point 0 expression broadcast air link resources. Corresponding to the downlink at access point 0 1910 there is an access point 0 neighbor expression broadcast interval and access point 0 neighbor expression broadcast air link resources as indicated by dashed line ellipse 1940. Access point 0 transmits signal 1942 conveying expression E3 and signal 1944 conveying expression E4 during the access point 0 neighbor expression broadcast interval using access point 0 neighbor expression broadcast air link resources.

WT 1 1902 receives signals (1932, 1942, 1944) and recovers expressions (E2, E3, E4) corresponding to WTs (WT 2 1904, WT 3 1906, WT 4 1908). WT 2 1904 receives signals (1930, 1942, 1944) and recovers expressions (E1, E3, E4) corresponding to WTs (WT 1 1902, WT 3 1906, WT 4 1908), respectively.

Corresponding to the downlink at access point 1 1912 there is an access point 1 expression broadcast interval and access point 1 expression broadcast air link resources as indicated by dashed line ellipse 1934. Access point 1 transmits signal 1936 conveying expression E3 and signal 1938 conveying expression E4 during the access point 1 expression broadcast interval using access point 1 expression broadcast air link resources. Corresponding to the downlink at access point 1 1912 there is an access point 1 neighbor expression broadcast interval and access point 1 neighbor expression broadcast air link resources as indicated by dashed line ellipse 1946. Access point 1 transmits signal 1948 conveying expression E1 and signal 1950 conveying expression E2 during the access point 1 neighbor expression broadcast interval using access point 1 neighbor expression broadcast air link resources.

WT 3 1906 receives signals (1938, 1948, 1950) and recovers expressions (E4, E1, E2) corresponding to WTs (WT 4 1908, WT 1 1902, WT 2 1904), respectively. WT 4 1908 receives signals (1936, 1948, 1950) and recovers expressions (E3, E1, E2) corresponding to WTs (WT 3 1906, WT 1 1902, WT 2 1904), respectively.

In one example, (E1, E2, E3, E4) conveys information including location information, e.g., GPS coordinates, corresponding to (WT 1 1902, WT 2 1904, WT 3 1906, WT 4 1908), respectively. Thus a wireless terminal is able to obtain the location of wireless terminals in their local vicinity corresponding to the same access point it is currently registered with via recovering information from the uplink expression advertisement interval and downlink expression broadcast interval corresponding to its access point. In addition the wireless terminal is able to obtain the location of wireless terminals at a neighboring access point via recovering information from the neighbor expression broadcast interval.

Figure 20:
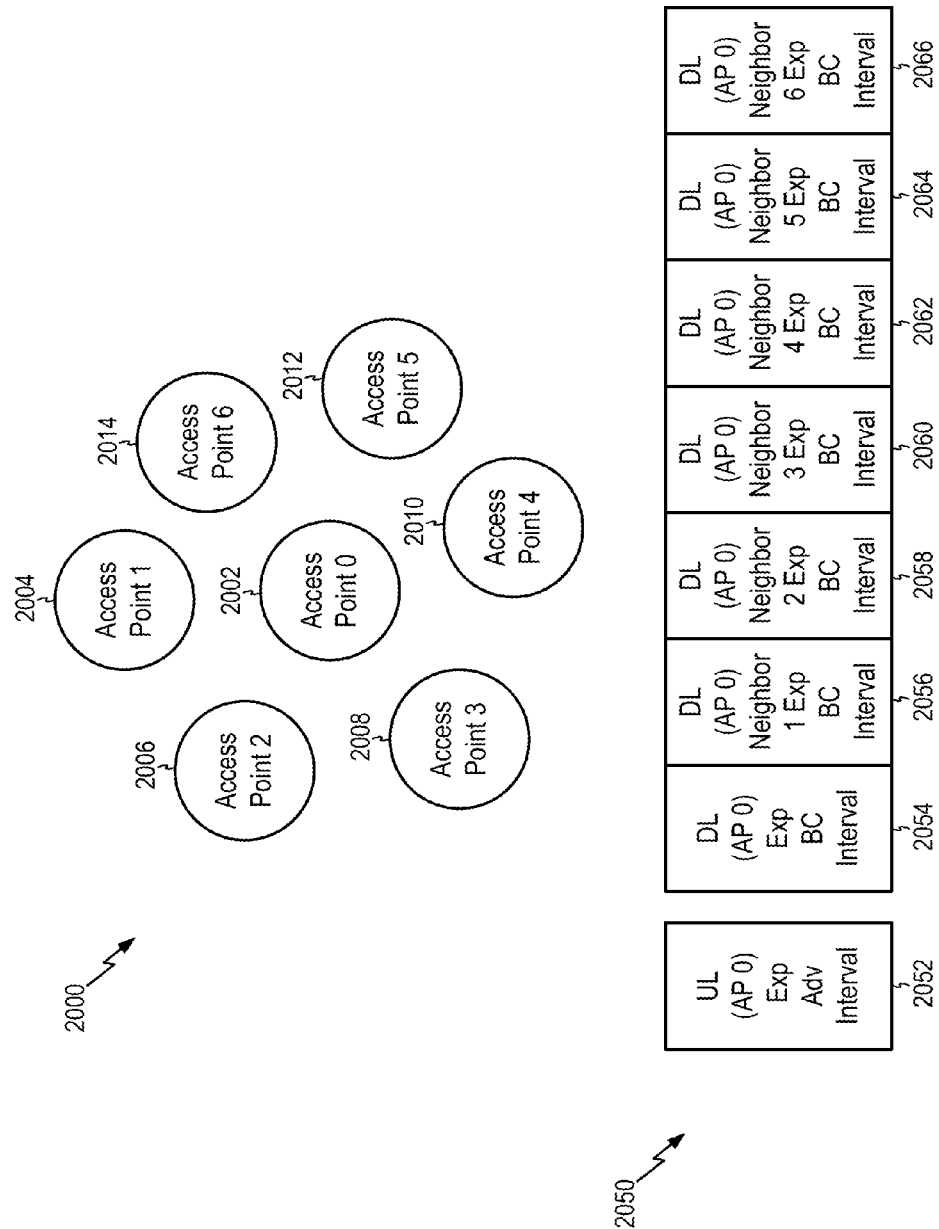
FIG. 20 is a drawing illustrating an access point, neighboring access points of the access point, and timing structure information used by the access point and wireless terminals registered at the access point, the timing structure information including an uplink expression advertisement interval, a downlink expression broadcast interval, and a plurality of neighbor expression broadcast intervals.

Drawing 2000 of FIG. 20 illustrates an exemplary access point 0 2002, e.g., base station 0, and a plurality of neighboring access points (access point 1 2004, access point 2 2006, access point 3 2008, access point 4 2010, access point 5 2012, access point 6 2014), which are adjacent access point 0 2002. The access points (2002, 2004, 2006, 2008, 2010, 2012, 2014) are coupled together via a backhaul network. The system including the access points also includes wireless terminals. Wireless terminals, e.g., mobile nodes, may move throughout the system, register with an access point in its local vicinity, and use that access point. As part of the registration, the wireless terminal acquires an identifier associated with a dedicated expression advertisement interval air link resource at that access point. The wireless terminal may transmit an expression over its dedicated expression advertisement air link resource. The wireless terminal may use its acquired identifier in both the sleep and active state with respect to the access point.

Drawing 2050 illustrates information describing intervals included in an exemplary timing structure used by access point 0 2002 and wireless terminals currently using access point 0 2002. There is an uplink expression advertisement interval 2052, followed by a downlink expression broadcast interval 2054, followed by a downlink neighbor 1 expression broadcast interval 2056, followed by a downlink neighbor 2 expression broadcast interval 2058, followed by a downlink neighbor 3 expression broadcast interval 2060, followed by a downlink neighbor 4 expression broadcast interval 2062, followed by a downlink neighbor 5 expression broadcast interval 2064, followed by a downlink neighbor 6 expression broadcast interval 2066. Each one of the downlink neighbor expression broadcast intervals (2056, 2058, 2060, 2062, 2064, 2066) corresponds to a different access point (AP 1 2004, AP 2 2006, AP 3 2008, AP 4 2010, AP 5 2012, AP 6 2014), respectively, which are adjacent access point 0 2002.

A wireless terminal in the vicinity of access node 0 2002 and registered with access node 0 2002 may recover advertisement information from other wireless terminal in the vicinity of access node 0 via monitoring the expression advertisement interval signaling of interval 2052 and via monitoring the expression broadcast interval signaling of interval 2054. The wireless terminal may recover advertisement information from wireless terminals in the vicinity of the neighboring access points by monitoring the neighboring expression broadcast interval signaling of intervals (2056, 2058, 2060, 2062, 2064, 2066).

In this example, each of the neighboring access points to access point 0 2002 is allocated a separate neighbor expression broadcast interval. In some embodiments, a neighbor expression broadcast interval corresponds to a plurality of different neighboring access points, e.g., adjacent access points.

In some embodiments, neighbors include access points within a range, e.g., a predetermined range, and information communicated in a neighbor expression broadcast interval may be from a neighbor which is not an immediate, e.g., adjacent, neighbor. In some embodiments, at least some neighbor expression broadcast intervals can, and sometimes do, include information from a server, e.g., a social networking server or a position tracking server.

Figure 21:
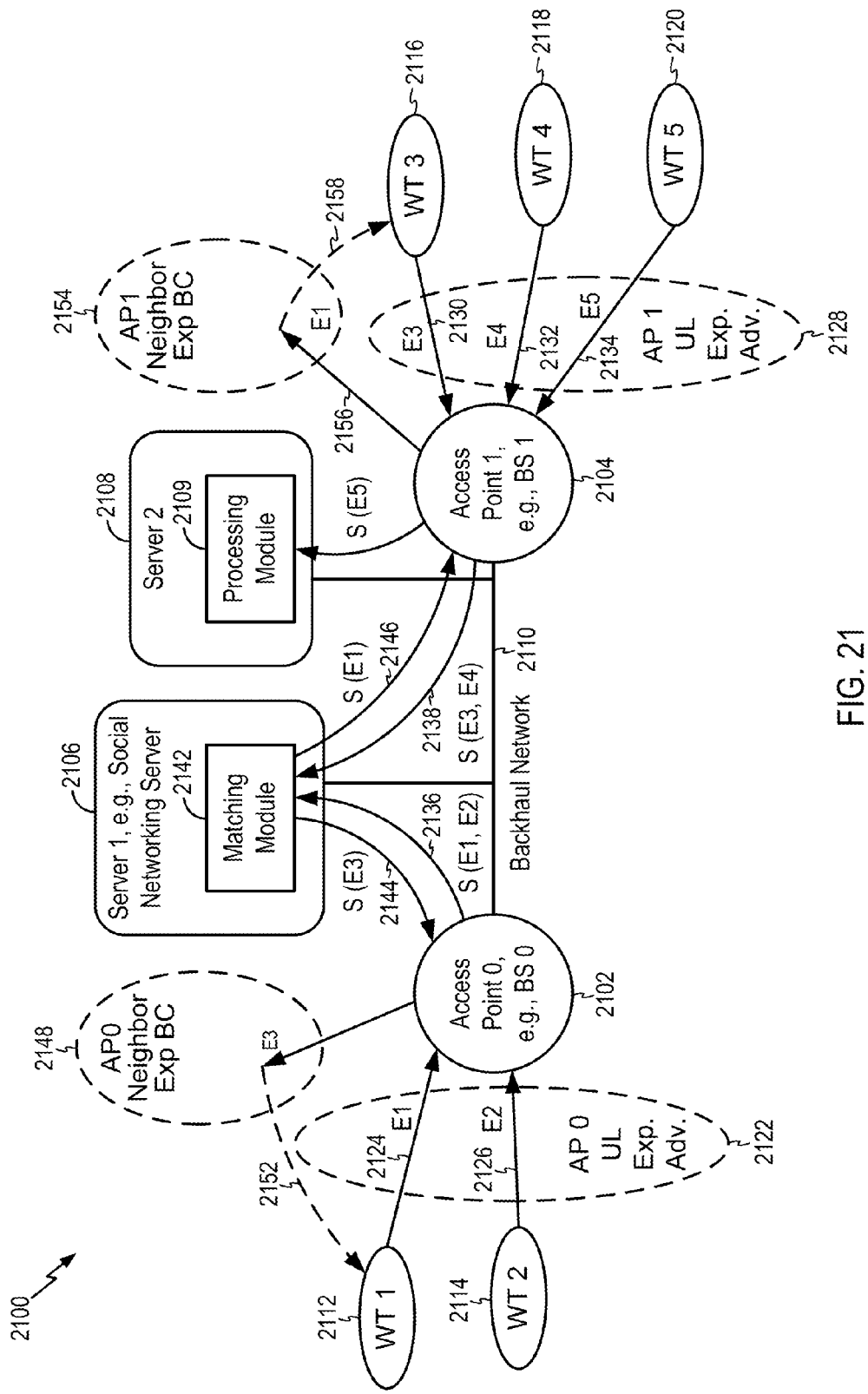
FIG. 21 is a drawing illustrating a signaling example in an exemplary embodiment in which an access point selectively forwards expression advertisement information and a server selectively forwards expression advertisement information.

FIG. 21 is a drawing 2100 illustrating an exemplary embodiment in which an access point selectively forwards advertisement expression information. The system of FIG. 21 includes a plurality of access points (access point 0 2102, access point 1 2104), a plurality of servers (server 1 2106, server 2 2108), and a plurality of wireless terminals (WT 1 2112, WT 2 2114, WT 3 2116, WT 4 2118, WT 5 2120). The access points (2102, 2104) are, e.g., base stations. Server 1 2106 is, e.g. a social networking server. The wireless terminals are, e.g., mobile nodes, which may move throughout the system and register with an access point in its current local vicinity. The various nodes (2102, 2104, 2106, 2108) are coupled together via a backhaul network 2110.

Consider that WT 1 2112 and WT 2 2114 are registered with access point 0 2102 and that wireless terminals (WT 3 2116, WT 4 2118, WT 5 2120) are registered with access point 1 2104. During access point 0 uplink expression advertisement interval 2122, wireless terminal 1 2112 transmits signal 2124 conveying expression E1 to access point 0 2102. During access point 0 uplink expression advertisement interval 2122, wireless terminal 2 2114 transmits signal 2126 conveying expression E2 to access point 0 2102.

During access point 1 uplink expression advertisement interval 2128, wireless terminal 3 2116 transmits signal 2130 conveying expression E3 to access point 1 2104. During access point 1 uplink expression advertisement interval 2128, wireless terminal 4 2118 transmits signal 2132 conveying expression E4 to access point 1 2104. During access point 1 uplink expression advertisement interval 2128, wireless terminal 5 2120 transmits signal 2134 conveying expression E5 to access point 1 2104.

Access point 0 2102 determines that expressions E1 and E2 should be forwarded to server 1 2106. Access point 0 2102 generates signal 2136, which conveys expressions E1 and E2 and transmits the signal 2136 over the backhaul network 2110 to server 1 2106. Access point 1 2104 determines that expressions E3 and E4 should be forwarded to server 1 2106 and that expression E5 should be forwarded to server 2 2108. Access point 1 2104 generates signal 2138, which conveys expressions E3 and E4 and transmits the signal 2138 over the backhaul network 2110 to server 1 2106. Access point 1 2104 generates signal 2140, which conveys expression E5 and transmits the signal 2140 over the backhaul network 2110 to server 2 2108. Server 2 2108 includes a processing module 2109. In some embodiments, information identifying the wireless terminal and/or user which sourced the expression (E1, E2, E3, E4, E5) is included in the signal (2136, 2136, 2138, 2138, 2140), respectively. In some embodiments, information identifying the wireless terminal and/or user which sources the expression (E1, E2, E3, E4, E5) is included in the expression (E1, E2, E3, E4, E5), respectively.

Server 1 2106, e.g., a social networking server, includes a matching module 2142. Matching module 2142 processes the received signals 2136 and 2138 and determines that wireless terminal 1 2112 and wireless terminal 3 2116 are members of the same group and are interested in receiving advertisement expression information from each other. Signal 2144, which conveys expression E3, is generated by matching module 2142 and communicated over the backhaul network 2110 to access point 0 2102. Signal 2146, which conveys expression E1, is generated by matching module 2142 and communicated over the backhaul network 2110 to access point 1 2104.

During access point 0 neighbor expression broadcast interval 2148 access point 0 2102 broadcast signal 2150 conveying expression E3. WT 1 2112 monitors the access point 0 expression broadcast interval 2148 and receives signal 2150 as indicated by dotted line arrow 2152, and recovers expression E3. During access point 1 neighbor expression broadcast interval 2154 access point 1 2104 broadcasts signal 2156 conveying expression E1. WT 3 2116 monitors the access point 1 neighbor expression broadcast interval 2154 and receives signal 2156 as indicated by dotted line arrow 2158, and recovers expression E1. In one exemplary embodiment expressions (E1, E2, E3, E4) include location information, e.g., GPS coordinates, corresponding to wireless terminals (WT 1 2112, WT 2 2114, WT 3 2116, WT 4 2118), respectively. In one exemplary embodiment expression E5 includes shopping related information, e.g., shopping preference information, pertaining to wireless terminal 5 2120.

In some embodiments an access point communicates a request to a server indicating wireless terminals of interest and the server selectively communicates a response including stored expression information which is available corresponding to the request which it has received. In some embodiments, the request information is stored at the server and used for matching purposes, e.g., should information from a wireless device of interest become available at a later time.

Any of the access points referred to with regard to FIGS. 14-21 may be an access point which implements a method in accordance with flowchart 200 of FIG. 2 and/or flowchart 800 of FIG. 8 and/or is implemented in accordance with any of the descriptions of FIGS. 3, 4, 9 and/or 10. Any of the wireless terminals referred to with regard to FIGS. 14-21 may be a wireless communications device which implements a method in accordance with flowchart 500 of FIG. 5 and/or flowchart 1100 of FIG. 11, and/or is implemented in accordance with any of the descriptions of FIGS. 6, 7, 12 and/or 13. Structures described in any of FIGS. 14-21 may be used in any of the devices described with respect to FIGS. 2-13.

Various features of some exemplary embodiment will now be described. An access point has an expression advertisement interval, e.g., a peer advertisement interval, in its timing structure. During the expression advertising interval there are expression advertisement air link resources. The expression advertisement air link resources include sets of communication resource units, e.g., sets of OFDM tone-symbols. A set of resource units, e.g., a set of OFDM tone-symbols of a predetermined size, is dedicated to each of the wireless terminals, e.g., peers, registered in the wide-area network at the access point.

The registered wireless terminals, e.g., mobiles, may use its dedicated set of resource units in the expression advertisement interval irrespective of whether it is operating in a sleep state or active state with respect to the access point. The dedicated set of resource units allocated to the registered wireless terminal in the expression advertisement interval allows the wireless terminal to communicate a relatively small amount of information, e.g., 128 information bits, to the access point. This information is communicated very efficiently with low overhead using the dedicated set of resource units.

The expression advertisement interval recurs in the timing structure at a relatively high rate in comparison to the rate that a wireless terminal in sleep state wakes up, e.g., wakes up to update paging related information and/or to perform other operations. For example, an expression advertisement interval may occur once per second, while the wake up from sleep state may occur once every 30 minutes or once per hour. The wake up from sleep state and subsequent communications can involve significant overhead signaling, e.g., access handshaking including closed loop timing and power control signaling, authentication, link establishment, acquisition of uplink traffic resources, and uplink of data in a traffic channel.

The registered wireless terminal transmits information in its dedicated set of resource units of the expression advertisement interval. For example, the registered wireless terminal, in some embodiments, communicates information to update its location information. Alternatively, or in addition the dedicated set of resource units of the expression advertisement interval are used, in some embodiments, by the registered wireless terminal to communicate any other information, e.g., any other low-latency, low-bit-rate information, to the access point.

In some embodiments, the dedicated set of resources dedicated to the registered wireless terminal within the plurality of sets of resources, can, and sometimes does, vary over time from one expression advertisement interval to another expression advertisement interval in accordance with a hopping function known to the access point and the registered wireless terminal.

In some embodiments a wireless terminal acquires an expression advertisement resource identifier when it registers with an access point and the expression advertisement resource identifier is good locally at that particular wireless terminal while the wireless terminal remains registered at the access point. However, if the wireless terminal moves, e.g. hands-off to another access point, the wireless terminal registers with the new access point and acquires a new expression advertisement resource identifier which is good locally at the new access point. In contrast a wireless terminal may acquire a paging identifier which is good in a paging area which includes a plurality of access points.

In some embodiments, different access points may have different expression advertising intervals and/or different rates of repetition with regard to the expression advertisement interval. In some embodiments, the amount of resources allocated to the expression advertisement interval in the WAN uplink timing frequency structure is a function of the expected traffic loading at the access point, e.g., with fewer resources being allocated for the expression advertisement interval where traffic loading is high. In some embodiments, the amount of resources and/or rate of repetition with regard to the expression advertisement interval is a function of the need for use of those expression advertisement air link resources. For example, consider that the expression advertisement resources are used to carry location information. The repetition rate may be chosen as a function of the expected position change rate of wireless terminals using the access point, e.g., if the access point is situated to cover the inside of a shopping mall where the wireless terminals change position rather slowly the repetition rate may be low. However, if the access point is situated to cover a region including a highway where the wireless terminals may be in vehicles traveling at a relatively high rate the repetition rate may be higher.

In some embodiments a wireless terminal, e.g., mobile node, may be registered concurrently with multiple access nodes in its local vicinity. In such a situation the wireless terminal may transmit expression advertisement information, e.g., location information, in multiple expression advertisement intervals, each interval corresponding to a different access point in its neighborhood with which it is currently registered and has acquired dedicated expression advertisement air link resources.

Similar to the expression advertising interval, each access point also has an associated expression broadcast interval. During the expression broadcast interval there are expression broadcast air link resources. The expression broadcast air link resources include sets of communication resource units, e.g., sets of OFDM tone-symbols. A set of resource units, e.g., a set of OFDM tone-symbols of a predetermined size, is dedicated to each of the wireless terminals, e.g., peers, registered in the wide-area network at the access point.

The access point broadcasts the information obtained from the expression advertisement interval, for the benefit of wireless devices, e.g., peers, that may be listening during the expression broadcast interval in the downlink. In some embodiments, this information is a copy of the information received in the peer advertising interval. In some other embodiments, the information communicated in the expression broadcast interval is a function of information received in the expression advertisement interval. The structure of the expression advertisement interval and expression broadcast interval in some embodiments are identical. In some other embodiments, the structure of the expression advertisement interval and expression broadcast interval are different.

In some embodiments, different access points can have a different expression broadcast intervals. In some embodiments different access point have expression broadcast intervals which repeat at different rates. In some embodiments different access point have expression broadcast intervals which occur at different time times.

A registered wireless terminal, e.g., peer, including a sleeping wireless terminal, has knowledge of the timing of the expression advertisement intervals and expression broadcast intervals corresponding to the access point with which it is registered. In some embodiments, the wireless terminal has knowledge of the timing of the expression advertisement intervals and expression broadcast intervals of the access points in its neighborhood.

In some embodiments an access point can choose to forward the information received in its expression advertisement interval to a server. In various embodiments and access point can obtain expression advertisement information corresponding to other access points in its neighborhood. The information can be obtained by the access point by listening to expression broadcast intervals of other access points in its neighborhood and/or by receiving expression information communicated from one access point to another via a backhaul network. In various embodiments, an access point can transmit the advertisement information obtained corresponding to a neighboring access point in a neighbor expression broadcast interval of its downlink timing structure.

One benefit of an exemplary method is that dedicated, low-latency, low-overhead channels are assigned to each of the wireless terminals, e.g. mobiles, wishing to participate in the expression advertisement mechanism, e.g. location update mechanism, including the wireless terminals, e.g., peers, that are in the "sleep" state. This facilitates efficient and scalable information dissemination, e.g., location update information dissemination.

The techniques of various embodiments may be implemented using software, hardware and/or a combination of software and hardware. In some embodiments, modules are implemented as physical modules. In some such embodiments, the individual physical modules are implemented in hardware, e.g., as circuits, or include hardware, e.g., circuits, with some software. In other embodiments, the modules are implemented as software modules which are stored in memory and executed by a processor, e.g., general purpose computer. Various embodiments are directed to apparatus, e.g., stationary wireless nodes, mobile wireless nodes such as mobile access terminals of which cell phones are but one example, access points, e.g., base stations, including one or more attachment points, servers, and/or communications systems. Various embodiments are also directed to methods, e.g., method of controlling and/or operating wireless communications devices including mobile and/or stationary nodes, access points, e.g., base stations, server nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, receiving information from a first wireless communications device in a first uplink communications resource while said first wireless communications device is operating in a sleep state with respect to the access point, said first uplink communications resource being dedicated to the first wireless communications device; processing the received information, etc.

Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While various features are described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), GSM and/or various other types of communications techniques which may be used to provide wireless communications links, e.g., WAN wireless communications links, between access points and wireless communications device such as mobile nodes and wireless communications. The methods and apparatus may be, and in various embodiments are, used with CDMA, orthogonal frequency division multiplexing (OFDM), GSM and/or various other types of communications techniques which may be used to provide wireless communications links, e.g., direct peer to peer wireless communications links, between wireless communications devices including peer to peer interfaces. In some embodiments the access points are implemented as base stations which communicate with mobile nodes using CDMA, GSM and/or OFDM. In various embodiments the mobile nodes are implemented as notebook computers, personal data assistants (PDAs), or other portable devices including receiver/transmitter circuits and logic and/or routines, for implementing the methods.

What is claimed is:

1. A method of operating an access point, the method comprising:
   receiving information for broadcast to wireless communications devices from a first wireless communications device in an uplink communications resource while said first wireless communications device is operating in a sleep state with respect to the access point, said uplink communications resource being dedicated to the first wireless communications device, said uplink communications resource being an air link resource for which there is a corresponding dedicated broadcast downlink resource dedicated to said first wireless communications device;
   processing the received information; and
   transmitting the received information for broadcast to wireless communications devices in said corresponding dedicated broadcast downlink resource,
   wherein said first uplink communications resource is part of a set of dedicated resources corresponding to an expression advertisement interval and includes one OFDM tone for a predetermined fixed number of OFDM symbol transmission time intervals,
   wherein said dedicated broadcast downlink resource is a downlink communications resource in a set of dedicated resources corresponding to an expression broadcast interval corresponding to said expression advertisement interval, and wherein the received information for broadcast to mobile wireless entities includes a device identifier identifying the first wireless communications device.

2. The method of claim 1,
   wherein said uplink communications resource corresponds to an expression advertisement resource identifier obtained by the first wireless communications device when registering with said access point.

3. The method of claim 1,
   wherein said expression advertisement interval recurs in accordance with a predetermined schedule.

4. The method of claim 1, further comprising:
   selectively forwarding at least some of the information received from the first wireless communications device in the first uplink communications resource.

5. An access point comprising:
   means for receiving information for broadcast to wireless communications devices from a first wireless communications device in an uplink communications resource while said first wireless communications device is operating in a sleep state with respect to the access point, said uplink communications resource being dedicated to the first wireless communications device, said uplink communications resource being an air link resource for which there is a corresponding dedicated broadcast downlink resource dedicated to said first wireless communications device;
   means for processing the received information; and
   means for transmitting the received information for broadcast to wireless communications devices in said corresponding dedicated broadcast downlink resource,
   wherein said first uplink communications resource is part of a set of dedicated resources corresponding to an expression advertisement interval and includes one OFDM tone for a predetermined fixed number of OFDM symbol transmission time intervals,
   wherein said dedicated broadcast downlink resource is a downlink communications resource in a set of dedicated resources corresponding to an expression broadcast interval corresponding to said expression advertisement interval, and wherein the received information for broadcast to mobile wireless entities includes a device identifier identifying the first wireless communications device.

6. The access point of claim 5,
   wherein said uplink communications resource corresponds to an expression advertisement resource identifier obtained by the first wireless communications device when registering with said access point.

7. The access point of claim 5,
   wherein said expression advertisement interval recurs in accordance with a predetermined schedule.

8. A computer program product for use in an access point, the computer program product comprising:
   a non-transitory computer readable medium comprising:
   code for causing at least one computer to receive information for broadcast to wireless communications devices from a wireless communications device in a first uplink communications resource while said first wireless communications device is operating in a sleep state with respect to the access point, said uplink communications resource being dedicated to the first wireless communications device, said uplink communications resource being an air link resource for which there is a corresponding dedicated broadcast downlink resource dedicated to said first wireless communications device;
   code for causing said at least one computer to process the received information; and
   code for causing said at least one computer to transmit the received information for broadcast to wireless communications devices in said dedicated broadcast downlink resource,
   wherein said first uplink communications resource is part of a set of dedicated resources corresponding to an expression advertisement interval and includes one OFDM tone for a predetermined fixed number of OFDM symbol transmission time intervals,
   wherein said dedicated broadcast downlink resource is a downlink communications resource in a set of dedicated resources corresponding to an expression broadcast interval corresponding to said expression advertisement interval, and wherein the received information for broadcast to mobile wireless entities includes a device identifier identifying the first wireless communications device.

9. An access point comprising:
   at least one processor configured to:
   receive information for broadcast to wireless communications devices from a first wireless communications device in a second uplink communications resource while said first wireless communications device is operating in a sleep state with respect to the access point, said second uplink communications resource being dedicated to the first wireless communications device, said uplink communications resource being an air link resource for which there is a corresponding dedicated broadcast downlink resource dedicated to said first wireless communications device;
   process the received information; and
   transmit the received information for broadcast to mobile wireless entities in said corresponding dedicated broadcast downlink resource; and
   memory coupled to said at least one processor, wherein said first uplink communications resource is part of a set of dedicated resources corresponding to an expression advertisement interval and includes one OFDM tone for a predetermined fixed number of OFDM symbol transmission time intervals, wherein said dedicated broadcast downlink resource is a downlink communications resource in a set of dedicated resources corresponding to an expression broadcast interval corresponding to said expression advertisement interval, and wherein the received information for broadcast to mobile wireless entities includes a device identifier identifying the first wireless communications device.

10. The access point of claim 9, wherein said uplink communications resource corresponds to an expression advertisement resource identifier obtained by the first wireless communications device when registering with said access point.

11. A method of operating a first wireless communications device, the method comprising:
generating a first set of information signals to be communicated to an access point for broadcast to wireless communications devices; and
transmitting the first set of information signals to the access point in a same first uplink communications resource for which there is a corresponding dedicated broadcast downlink resource dedicated to said first wireless communications device which occurs according to a predetermined schedule; and
monitoring for broadcast signals corresponding to wireless terminals of interest during an expression broadcast interval including said corresponding dedicated broadcast downlink resource,
wherein said first uplink communications resource is part of a set of dedicated resources corresponding to an expression advertisement interval and includes one OFDM tone for a predetermined fixed number of OFDM symbol transmission time intervals,
wherein said dedicated broadcast downlink resource is a downlink communications resource in a set of dedicated resources corresponding to an expression broadcast interval corresponding to said expression advertisement interval, and wherein the received information for broadcast to mobile wireless entities includes a device identifier identifying the first wireless communications device.

12. The method of claim 11, wherein said first uplink communications resource is part of a set of dedicated resources corresponding to an expression advertisement interval.

13. The method of claim 12, wherein said expression advertisement interval recurs in accordance with the predetermined schedule, said predetermined schedule being a recurring schedule.

14. The method of claim 13, wherein the location of the set of OFDM tone-symbols is determined according to a predetermined hopping function.

15. The method of claim 12, further comprising:
receiving a signal from the access point indicating assignment of the first uplink communications resource to said first wireless communications device.

16. A first wireless communications device, comprising:
means for generating a first set of information signals to be communicated to an access point for broadcast to wireless communications devices; and
means for transmitting the first set of information signals to the access point in a first uplink communications resource for which there is a corresponding dedicated broadcast downlink resource dedicated to said first wireless communications device which occurs according to a predetermined schedule; and
means for monitoring for broadcast signals corresponding to wireless terminals of interest during an expression broadcast interval including said corresponding dedicated broadcast downlink resource,
wherein said first uplink communications resource is part of a set of dedicated resources corresponding to an expression advertisement interval and includes one OFDM tone for a predetermined fixed number of OFDM symbol transmission time intervals,
wherein said dedicated broadcast downlink resource is a downlink communications resource in a set of dedicated resources corresponding to an expression broadcast interval corresponding to said expression advertisement interval, and wherein the received information for broadcast to mobile wireless entities includes a device identifier identifying the first wireless communications device.

17. The first wireless communications device of claim 16, wherein said expression advertisement interval recurs in accordance with the predetermined schedule, said predetermined schedule being a recurring schedule.

18. The first wireless communications device of claim 17, wherein the location of the set of OFDM tone-symbols is determined according to a predetermined hopping function.

19. A computer program product for use in a first wireless communications device, the computer program product comprising:
a non-transitory computer readable medium comprising:
code for causing at least one computer to generate a first set of information signals to be communicated to an access point for broadcast to wireless communications devices; and
code for causing said at least one computer to transmit the first set of information signals to the access point in a first uplink communications resource for which there is a corresponding dedicated broadcast downlink resource dedicated to said first wireless communications device which occurs according to a predetermined schedule; and
code for causing said at least one computer to monitor for broadcast signals corresponding to wireless terminals of interest during an expression broadcast interval including said corresponding dedicated broadcast downlink resource,
wherein said first uplink communications resource is part of a set of dedicated resources corresponding to an expression advertisement interval and includes one OFDM tone for a predetermined fixed number of OFDM symbol transmission time intervals,
wherein said dedicated broadcast downlink resource is a downlink communications resource in a set of dedicated resources corresponding to an expression broadcast interval corresponding to said expression advertisement interval, and wherein the received information for broadcast to mobile wireless entities includes a device identifier identifying the first wireless communications device.

20. A first wireless communications device comprising:
at least one processor configured to:
generate a first set of information signals to be communicated to an access point for broadcast to wireless communications devices; and transmit the first set of information signals to the access point in a first uplink communications resource for which there is a corresponding dedicated broadcast downlink resource dedicated to said first wireless communications device which occurs according to a predetermined schedule; and monitor for broadcast signals corresponding to wireless terminals of interest during an expression broadcast interval including said corresponding dedicated broadcast downlink resource; and memory coupled to said at least one processor, wherein said first uplink communications resource is part of a set of dedicated resources corresponding to an expression advertisement interval and includes one OFDM tone for a predetermined fixed number of OFDM symbol transmission time intervals, wherein said dedicated broadcast downlink resource is a downlink communications resource in a set of dedicated resources corresponding to an expression broadcast interval corresponding to said expression advertisement interval, and wherein the received information for broadcast to mobile wireless entities includes a device identifier identifying the first wireless communications device.

21. The first wireless communications device of claim 20, wherein said expression advertisement interval recurs in accordance with the predetermined schedule, said predetermined schedule being a recurring schedule.

* * * * *